(12) United States Patent
Swarup et al.

(10) Patent No.: US 7,907,346 B2
(45) Date of Patent: Mar. 15, 2011

(54) PHOTOCHROMIC MATERIALS AND PHOTOCHROMIC COMPOSITIONS AND ARTICLES INCLUDING THE SAME

(75) Inventors: Shanti Swarup, Allison Park, PA (US); Carol L. Knox, Monroeville, PA (US); Feng Wang, Export, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 1033 days.

(21) Appl. No.: 11/687,053

(22) Filed: Mar. 16, 2007

(65) Prior Publication Data

US 2008/0225400 A1   Sep. 18, 2008

(51) Int. Cl.
   *G02B 3/00*   (2006.01)
   *C09K 19/12*   (2006.01)

(52) U.S. Cl. ......... 359/642; 428/482; 430/541; 430/559

(58) Field of Classification Search .................. 428/480, 428/482; 359/642; 430/541, 559
   See application file for complete search history.

(56) References Cited

U.S. PATENT DOCUMENTS

| | | |
|---|---|---|
| 3,971,872 A | 7/1976 | LeBoeuf |
| 4,931,220 A | 6/1990 | Haynes et al. |
| 5,104,692 A | 4/1992 | Belmares |
| 5,645,767 A | 7/1997 | Van Gemert |
| 5,658,501 A | 8/1997 | Kumar et al. |
| 5,698,141 A | 12/1997 | Kumar |
| 5,723,072 A | 3/1998 | Kumar |
| 6,022,497 A | 2/2000 | Kumar |
| 6,025,026 A | 2/2000 | Smith et al. |
| 6,060,001 A | 5/2000 | Welch et al. |
| 6,068,797 A | 5/2000 | Hunt |
| 6,113,814 A | 9/2000 | Gemert et al. |
| 6,150,430 A | 11/2000 | Walters et al. |
| 6,153,126 A | 11/2000 | Kumar |
| 6,187,444 B1 | 2/2001 | Bowles, III et al. |
| 6,268,055 B1 | 7/2001 | Walters et al. |
| 6,432,544 B1 | 8/2002 | Stewart et al. |
| 6,436,525 B1 | 8/2002 | Welch et al. |
| 6,506,488 B1 | 1/2003 | Stewart et al. |
| 6,531,076 B2 | 3/2003 | Crano et al. |
| 6,555,028 B2 | 4/2003 | Walters et al. |
| 6,582,822 B2 | 6/2003 | Faler et al. |
| 6,602,603 B2 | 8/2003 | Welch et al. |
| 6,884,845 B2 | 4/2005 | Swarup et al. |
| 6,916,537 B2 | 7/2005 | Welch et al. |
| 7,008,568 B2 * | 3/2006 | Qin .............................. 252/586 |
| 7,097,303 B2 | 8/2006 | Kumar et al. |
| 7,097,549 B2 | 8/2006 | Allison et al. |
| 7,144,969 B2 | 12/2006 | McDonald |
| 7,666,331 B2 * | 2/2010 | King et al. ..................... 252/582 |
| 2003/0165686 A1 | 9/2003 | Blackburn et al. |

(Continued)

OTHER PUBLICATIONS

*Ullmann's Encyclopedia of Industrial Chemistry,* "Polymerization Processes," vol. 21A.

(Continued)

*Primary Examiner* — Thao T. Tran
(74) *Attorney, Agent, or Firm* — Deborah M. Altman; Frank P. Mallak

(57) ABSTRACT

Photochromic materials and photochromic compositions and articles including the photochromic materials are disclosed. The photochromic materials may be the reaction product of a hyperbranched polyester polyol having, on average, at least two reactive hydroxyl groups, and at least one photochromic indeno-fused naphthopyran.

22 Claims, 1 Drawing Sheet

U.S. PATENT DOCUMENTS

2005/0196626 A1* 9/2005 Knox et al. .................. 428/447
2006/0022176 A1  2/2006 Wang et al.
2006/0226400 A1  10/2006 Xiao et al.
2006/0228557 A1  10/2006 Kim et al.

OTHER PUBLICATIONS

*Techniques in Chemistry*, vol. III, "Photochromism", Chapter 3, Glenn H. Brown, Editor, John Wiley and Sons, Inc., New York, 1971.

* cited by examiner

PHOTOCHROMIC MATERIALS AND PHOTOCHROMIC COMPOSITIONS AND ARTICLES INCLUDING THE SAME

BACKGROUND

Various non-limiting embodiments disclosed herein generally relate to photochromic materials which comprise a hyperbranched polyester and at least one photochromic group. Other non-limiting embodiments relate to photochromic compositions and articles, such as but not limited to ophthalmic lenses, that include the disclosed photochromic materials.

Photochromic materials can be incorporated into polymeric materials to impart desired optical properties to the polymeric material. For example, photochromic materials have been successfully incorporated into polymeric materials that are used to form ophthalmic lenses, as well as polymeric coatings applied thereto. Typically, the polymeric materials into which the photochromic materials are incorporated are relatively soft, and thus, susceptible to mechanical damage, such as scuffing and scratching. Since it is generally undesirable for certain articles of manufacture, such as ophthalmic lenses, to be susceptible to such damage, often one or more "hard coatings" are applied to the surfaces of the articles to enhance, among other things, their abrasion-resistance. For example, hard coatings are routinely applied to the surfaces of ophthalmic lenses formed from "soft" polymeric materials to enhance their abrasion-resistance.

However, it has been observed that, under certain conditions, photochromic materials have a tendency to migrate from the soft polymeric material into which they are initially incorporated into such other hard coatings. Since the photochromic performance of a photochromic material (i.e., the coloration (or activation) and/or fade rates of the photochromic material) may be influenced by the local environment surrounding the photochromic material, migration may deteriorate photochromic performance. Generally speaking, for an organic photochromic material, the time required for coloration or bleaching to occur tends to increase with the hardness of the local environment surrounding the photochromic material. Thus, when a photochromic material migrates from a relatively soft or flexible environment to a relatively hard or rigid environment, the performance of the material photochromic tends to deteriorate. That is, the time required for coloration and/or bleaching tends to increase. Consequently, migration may result in a decrease of the utility of a photochromic material, as well as that of a coating or an article into which it is incorporated.

One method of reducing the migration of a photochromic material in a polymeric material is to bond the photochromic material to the polymeric material. For example, photochromic materials having relatively short, organic chain segments that can be polymerized into a polymeric material have been disclosed. Such photochromic materials have a reduced tendency to migrate in the polymeric material due to the physical constraints afforded by bonding of the photochromic material to the polymeric material. However, bonding the photochromic material to the polymeric material using such short, organic chain segments can have the effect of slowing the coloration and/or fade rates of the photochromic material as compared to a similar photochromic material that is not bonded to the polymeric material. Additionally, for some photochromic materials, it is preferred to place the short, organic chain segments at locations that are distant from the "active" portion of the photochromic material, i.e., that portion of the photochromic material that undergoes reversible transformation from one state to another on exposure to actinic radiation. That is, for some photochromic materials, if the chain segments are placed too close to the active portion of the photochromic material, the ability of the photochromic material to transform may be impeded. Consequently, the photochromic performance of the material may be diminished.

Other methods of modifying the fade rates of photochromic materials have focused on creating a relatively "soft" environment around the photochromic material, such that the photochromic performance of the material is relatively unaffected by the hardness of the polymeric material into which it is incorporated, rather than reducing migration. For example, photochromic materials that are adducts of a photochromic moiety and at least one pendant oligomeric group have been disclosed. However, because such photochromic materials are not generally bonded to the polymeric materials into which they are incorporated, phase separation may occur if the photochromic materials are not compatible with the polymeric material. That is, the photochromic materials may separate from the polymeric material, which can result in undesirable properties, such as haze and/or blooming, which can limit the utility of the materials in many applications wherein the transparency is important.

Accordingly, it would be advantageous to develop photochromic materials having both a reduced tendency to migrate and favorable coloration and/or fade rates that can be incorporated into a variety of polymeric materials.

BRIEF SUMMARY OF THE DISCLOSURE

Various non-limiting embodiments of the present disclosure provide for photochromic materials which comprise hyperbranched polyester and at least one photochromic groups. For example, in one non-limiting embodiment, the present disclosure provides a photochromic polyester comprising a reaction product of a hyperbranched polyester polyol comprising, on average, more than two hydroxyl groups, and a photochromic compound comprising a group that is adapted to react with a hydroxyl group of the hyperbranched polyester polyol. The group that is adapted to react with the hydroxyl group of the hyperbranched polyester polyol is at least one of an isocyanate (—NCO), a carboxylic acid (—C(=O)OH), alkyl ester (—C(=O)OR), amide (—C(=O)NR$_2$), anhydride (—C(=O)OC(=O)R), chloroformate (—C(=O)Cl), or epoxy. The photochromic compound is selected from the group consisting of benzopyrans, naphtho[1,2-b]pyrans, naphtho[2,1-b]pyrans, indeno-fused naphthopyrans, heterocyclic-fused naphthopyrans, spiro-9-fluoreno[1,2-b]pyrans, phenanthropyrans, quinopyrans, fluoroanthenopyrans, spiropyrans, benzoxazines, naphthoxazines, spiro-oxazines, fulgides, and fulgimides.

Another non-limiting embodiment of the present disclosure provides a photochromic polyester comprising a hyperbranched polyester and at least two photochromic indeno-fused naphthopyrans bonded to the hyperbranched polyester.

Still other non-limiting embodiments provide a photochromic composition comprising the photochromic polyesters, as described herein, and a polyurethane, wherein the photochromic polyester is bonded to at least a portion of the polyurethane.

Further non-limiting embodiments provide for photochromic articles comprising a substrate and an at least partial photochromic coating on at least a portion of a surface of the substrate. The at least partial photochromic coating comprises the photochromic polyesters as described herein.

Still further non-limiting embodiments of the present disclosure provide for a photochromic material represented by the structure:

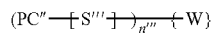

wherein W is a hyperbranched polyester polyol, n''' is an integer ranging from 2 to 100, each PC'' is independently a photochromic group, such as an indeno-fused naphthopyran, and each S''' is independently a group represented by:

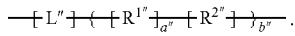

For the group S''', each L'' is independently a linking group that forms at least one covalent bond with a group $R^{1''}$ or a group $R^{2''}$ and at least one covalent bond with PC''. The linking group can be —O—, —N—, or —S—; or L'' can comprise a linear or branched organic bridging group comprising a linking group that forms at least one covalent bond with a group $R^{1''}$ or a group $R^{2''}$, wherein the linking group is —O—, —N—, or —S—. Further, for the group S''', each a'' is independently an integer ranging from 0 to 500; each $R^{1''}$ is independently a ring-opened cyclic monomer; each $R^{2''}$ is independently a residue of one of a diisocyanate, a dicarboxylic acid, a diester, a diamide, a dianhydride, a bis epoxide, or a bischloroformate, wherein the residue comprises at least one of a urethane group, an ester group, an amide group, an ether group, a thio ester group, a thio ether group, a urea group, or a carbamate group, that forms a bond with a reactive residue on W; and each b'' is independently an integer ranging from 1 to 20.

According to still other non-limiting embodiments, the present disclosure provides for a photochromic polyester comprising a reaction product of a hyperbranched polyester polyol comprising, on average, more than two hydroxyl groups, an aliphatic diisocyanate represented by OCN—$(CR_2)_n$—NCO, wherein n is an integer ranging from 20 to 40 and each R may independently be H or $C_1$-$C_4$ alkyl, and an indeno-fused naphthopyran comprising at least one reactive hydroxyl group.

BRIEF DESCRIPTION OF THE DRAWINGS

Aspects of the present invention will be better understood when read in conjunction with the figures, in which.

DETAILED DESCRIPTION OF VARIOUS NON-LIMITING EMBODIMENTS OF THE INVENTION

Figure 1:
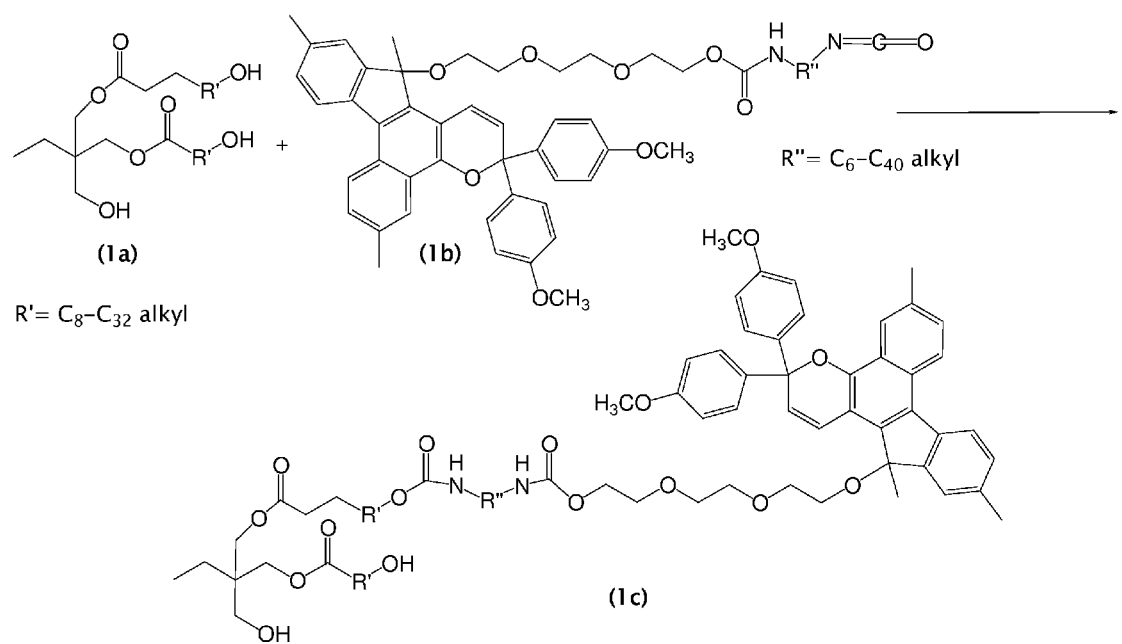
FIG. 1 illustrates one approach to the synthesis of a hyperbranched polyester polyol having a photochromic moiety attached thereto.

Various non-limiting embodiments of the present invention will now be described. It is to be understood that while the present invention is described herein connection with certain embodiments and examples, the present invention is not limited to the particular embodiments and examples disclosed, but is intended to cover modifications that are within the spirit and scope of the invention, as defined by the appended claims. Further, it is to be understood that the present description illustrates aspects of the invention relevant to a clear understanding of the invention. Accordingly, certain aspects of the invention that would be apparent to those of ordinary skill in the art and that, therefore, would not facilitate a better understanding of the invention have not been presented in order to simplify the present description.

As used in this specification and the appended claims, the articles "a," "an," and "the" include plural referents unless expressly and unequivocally limited to one referent. Additionally, for the purposes of this specification, unless otherwise indicated, all numbers expressing quantities, such as weight percentages and processing parameters, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from, for example, the measurement equipment and/or measurement technique. Furthermore, when numerical ranges are set forth herein, these ranges are inclusive of the recited range end point(s).

Moreover, it should be appreciated that where listings of possible substituent groups are provided herein using headings or subheadings, such as for example: (a), (b) . . . ; (1), (2) . . . ; (i), (ii) . . . ; etc., these headings or subheadings are provided only for convenience of reading and are not intended to in anyway limit the choice of substituent groups.

Photochromic materials according to various non-limiting embodiments of the invention will now be discussed. As used herein, the term "photochromic" means having an absorption spectrum for at least visible radiation that varies in response to at least actinic radiation. As used herein, the term "photochromic material" means any substance that is adapted to display photochromic properties, i.e. adapted to have an absorption spectrum for at least visible radiation that varies in response to at least actinic radiation. As used herein, the term "actinic radiation" refers to electromagnetic radiation that is capable of causing a photochromic material to transform from one form or state to another.

Example of photochromic materials include, without limitation, photochromic groups (e.g., indeno-fused naphthopyrans, etc.), as well as polymers, oligomers, monomers, and other compounds that comprise at least one photochromic group. As used herein, the term "group" means an arrangement of one or more atoms. Further, as used herein, the term "photochromic group" refers to an arrangement of atoms comprising a photochromic moiety. The term "moiety", as used herein, means a part or portion of an organic molecule that has a characteristic chemical property. As used herein, the term "photochromic moiety" refers the portion of a photochromic group that can undergo a reversible photochromic transformation from one state to another on exposure to actinic radiation.

The photochromic materials according to various non-limiting embodiments disclosed herein may comprise, in addition to a photochromic group, one or more other groups (e.g., functional groups, aliphatic groups, alicyclic groups, aromatic groups, heteroaromatic groups, heterocyclic groups, etc.) that are linked or fused to the photochromic group or another portion of the photochromic material. As used herein, the term "linked" means covalently bonded. Further, as used herein, the term "fused" means covalently bonded at least two positions.

Various non-limiting embodiment of the present disclosure relate to photochromic materials including photochromic polymers comprising photochromic groups. Specifically, certain embodiments disclosed herein provide a hyperbranched photochromic polymer comprising the reaction product of branched polymer comprising, on average, more than two reactive groups and a photochromic group, such as an indeno-fused naphthopyran, comprising a group that is adapted to react with a reactive group of the branched polymer. According to various non-limiting embodiments, the reactive groups of the branched polymer may comprise, for example, hydroxyl groups, amino groups, thiol groups, isocyanate groups, carboxylate groups (including carboxylic acids, esters, and anhydrides), and combinations of any thereof. The group on the photochromic group that is adapted to react with the branched polymer reactive group may comprise at least one of an isocyanate, hydroxyl, amino, carboxylic acid, ester, amide, anhydride, and epoxy. As used herein the term "reaction product" means a product that results from a chemical reaction between the identified components, optionally in the presence of one or more other non-listed components such as, but not limited to, catalysts, initiators, solvents, co-reactants, and the like that aid, initiate or facilitate the chemical reaction but do not change the nature of the reaction product. As used herein the term "hyperbranched" means a substrate, such as a polymer, having a large number of branching points and end groups, and which may include segments that are substantially linear.

Non-limiting examples of reactions in which the hyperbranched polymer comprising, on average, more than two reactive groups, and the photochromic group, such as an indeno-fused naphthopyran, comprising the group adapted to react with a reactive of the hyperbranched polymer may participate include: addition reactions (including nucleophilic addition reactions and electrophilic addition reactions), elimination reactions, condensation reactions, substitution reactions, and polymerization reactions (e.g., radical polymerization, anionic polymerization, cationic polymerization, ring-opening polymerization, condensation polymerization, addition polymerization, and such polymerization processes that are described in *Ullmann's Encyclopedia of Industrial Chemistry*, "Polymerization Processes," Vol. 21A, at pages 305 to 428, which are hereby specifically incorporated by reference). Methods of performing such reactions are known to those skilled in the art.

Certain non-limiting embodiments of the present disclosure relate to photochromic materials, and more particularly relate to a photochromic polyesters comprising photochromic groups. For example, various non-limiting embodiments disclosed herein provide a photochromic polyester comprising a reaction product of a hyperbranched polyester polyol comprising, on average, more than two hydroxyl groups, and a photochromic group comprising a group that is adapted to react with a hydroxyl group of the hyperbranched polyester polyol, said group that is adapted to react with a hydroxyl group of the hyperbranched polyester polyol being at least one of isocyanate, carboxylic acid, ester, amide, anhydride, chloroformate, or epoxy. The reaction product between the hyperbranched polyester polyol and the photochromic group comprising the group adapted to react with a hydroxyl group on the hyperbranched polyester polyol, may comprise a carbamate functionality, an ester functionality, and an ether functionality. The photochromic group may be one of ben-zopyrans, naphtho[1,2-b]pyrans, naphtho[2,1-b]pyrans, indeno-fused naphthopyrans, heterocyclic-fused naphthopyrans, spiro-9-fluoreno[1,2-b]pyrans, phenanthropyrans, quinopyrans, fluoroanthenopyrans, spiropyrans, benzoxazines, naphthoxazines, spiro-oxazines, fulgides, or fulgimides.

In other non-limiting embodiments, the photochromic polyester may comprise the reaction product of a hyperbranched polyester polyol comprising, on average, more than two hydroxyl groups, as described herein, and an indeno-fused naphthopyan comprising a group that is adapted to react with a hydroxyl group of the hyperbranched polyester polyol being at least one of isocyanate, carboxylic acid, ester, amide, anhydride, chloroformate, or epoxy. The reaction product between the hyperbranched polyester polyol and the indeno-fused naphthopyran comprising the group adapted to react with a hydroxyl group on the hyperbranched polyester polyol, may comprise a carbamate functionality, an ester functionality, and an ether functionality.

Methods of forming photochromic polyesters according to various non-limiting embodiments disclosed herein are set forth below in more detail, and specific non-limiting examples of methods of forming photochromic polyesters according to various non-limiting embodiments disclosed herein are set forth in the Examples.

Referring now to FIG. 1, although not limiting herein, according to one non-limiting embodiment, the photochromic polyester may be the reaction product of a hyperbranched polyester polyol (1a), which comprises, on average, more than two hydroxyl groups, and an indeno-fused naphthopyran (1b), which comprises an isocyanate group that may be reacted with a hydroxyl group of the hyperbranched polyester polyol in a condensation reaction, optionally in the presence of a catalyst, to form a photochromic polyester (1c) according to one non-limiting embodiment of the present disclosure. As used herein, the term "on average, more than two hydroxyl groups" means the molecules of a hyperbranched polyester polyol have on average (i.e., the majority of molecules of the hyperbranched polyester polyols) more than two end groups comprising hydroxyl groups.

Another non-limiting embodiment provides a photochromic polyester comprising a reaction product of:

(a) a hyperbranched polyester polyol comprising, on average, more than two hydroxyl groups;

(b) an aliphatic diisocyanate represented by $OCN-(CR_2)_n-NCO$, wherein n is an integer ranging from 3 to 40 and each R may be, independently, H or $C_1$-$C_4$ alkyl; and (c) an indeno-fused naphthopyran comprising at least one reactive hydroxyl group.

According to these non-limiting embodiments, the hyperbranched polyester polyol comprising, on average, more than two hydroxyl groups and the aliphatic diisocyanate represented by $OCN-(CR_2)_n-NCO$, wherein n is an integer ranging from 3 to 40 (in other embodiments, n may range from 20 to 40) and each R may be, independently, H or $C_1$-$C_4$ alkyl, may be pre-reacted. That is, prior to reacting with the indeno-fused naphthopyran comprising at least one reactive hydroxyl group, at least one of the more than two hydroxyl groups on the hyperbranched polyester polyol and the aliphatic diisocyanate may be reacted to form a hyperbranched polyester polyol comprising at least one reactive isocyanate groups. Thereafter, the hyperbranched polyester polyol comprising at least one reactive isocyanate groups may be reacted with the indeno-fused naphthopyran comprising at least one reactive hydroxyl group, such that the hydroxyl group at least one indeno-fused naphthopyran reacts with the at least one reactive isocyanate groups of the hyperbranched polyester polyol.

Additionally or alternatively, according to these non-limiting embodiments, the aliphatic diisocyanate represented by $OCN—(CR_2)_n—NCO$, wherein n is an integer ranging from 3 to 40 (in other embodiments, n may range from 20 to 40) and each R may be, independently, H or $C_1$-$C_4$ alkyl, and the indeno-fused naphthopyran comprising at least one reactive hydroxyl group may be pre-reacted. That is, prior to reacting with the hyperbranched polyester polyol, the aliphatic diisocyanate represented and the indeno-fused naphthopyran comprising at least one reactive hydroxyl group may be reacted to form an indeno-fused naphthopyran comprising a reactive isocyanate group. Thereafter the indeno-fused naphthopyran comprising a reactive isocyanate group may be reacted with the hyperbranched polyester polyol such that the reactive isocyanate group of the indeno-fused naphthopyran reacts at least one of the hydroxyl groups of the hyperbranched polyester polyol (for example, as discussed above).

Non-limiting examples of hyperbranched polyester polyols that may used to form the photochromic polyesters according to various non-limiting embodiments disclosed herein include hyperbranched polyester polyols that are the reaction product of:
  (a) a branched polyol comprising, on average, more than two hydroxyl groups;
  (b) an aliphatic monocarboxylic acid comprising a chain of at least 10 carbon atoms; and
  (c) a dicarboxylic acid or a lactone, wherein the lactone may be a cyclic ester having from 3 to 10 ring carbons and wherein dicarboxylic acid may be at least one of:
    (i) an aliphatic dicarboxylic acid comprising represented by $HOOC—(CH_2)_m—COOH$, wherein m is an integer ranging from 8 to 32,
    (ii) an alicyclic dicarboxylic acid comprising from 4 to 20 carbon atoms in the alicyclic ring, or
    (iii) an aromatic dicarboxylic acid comprising an from 6 to 10 carbon atoms in the aromatic ring.

Non-limiting examples of branched polyols comprising, on average, more than two hydroxyl groups that may be useful in forming hyperbranched polyester polyols that may be reacted as described herein, for example, with an indeno-fused naphthopyran comprising a group adapted to react with at least one of the hydroxyl groups, to form a photochromic polyester according to various non-limiting embodiments disclosed herein include: trimethylolpropane (1,1,1-tris(hydroxymethyl)propane), di-trimethylolpropane, glycerol, pentaerythritol, 1,3,4-butanetriol, 1,2,6-hexanetriol, 1,2,9-nonanetriol, trimethanolethane (1,1,1-tris(hydroxymethyl)ethane), sugar alcohols, such as sorbitol and mannitol, other polyhydroxymethyl ($C_2$-$C_{10}$)alkanes, or mixtures thereof.

Non-limiting examples of aliphatic monocarboxylic acids comprising a chain of at least 10 carbon atoms that may be useful in forming hyperbranched polyester polyols that may be reacted with an indeno-fused naphthopyran to form a photochromic polyester according to various non-limiting embodiments disclosed herein include: decanoic acid (capric acid); dodecanoic acid (lauric acid); tetradecanoic acid (myristic acid); hexadecanoic acid (palmitic acid); 9-hexadecenoic acid (palmitoleic acid); octadecanoic acid (stearic acid); isooctadecanoic acid (isostearic acid); 9-octadecenoic acid (oleic acid); 11-octadecenoic acid (vaccenic acid); 9,12-octadecandienoic acid (linoleic acid); 9,12,15-octadecatrienoic acid (α-linolenic acid); 6,9,12-octadecatrienoic acid (γ-linolenic acid); eicosanoic acid (arachidic acid); 9-eicosenoic acid (gadoleic acid); 5,8,11,14-eicosatetraenoic acid (arachidonic acid); 5,8,11,14,17-eicosapentaenoic acid; docosanoic acid (behenic acid); 12-docosenoic acid (erucic acid); 4,7,10,13,16,19-docosahexaenoic acid; tetracosanoic acid (lignoceric acid); isomers thereof or mixtures thereof.

Non-limiting examples of lactones may include substituted and unsubstituted lactones comprising from 3-10 carbon atoms in the lactone ring, such as, for example, propiolactone, butyrolactone, valerolactone, caprolactone, enantholactone, caprylolactone, pelargolactone, capriolactone, and mixtures thereof.

Non-limiting examples of aliphatic dicarboxylic acids may include those represented by $HOOC—(CH_2)_m—COOH$, wherein m is an integer ranging from 8 to 32 as well as other aliphatic dicarboxylic acids such as branched aliphatic dicarboxylic acids. Non-limiting examples of aliphatic dicarboxylic acids that may be suitable for use in certain embodiments of the present disclosure include 1,8-octanedioic acid (suberic acid); 1,9-nonanedioic acid (azelaic acid); 1,10-decanedioic acid (sebacic acid); 1,12-dodecanedioic acid; 1,13-tridecanedioic acid brassylic acid); 1,14-tetradecanedioic acid; 1,15-pentadecanedioic acid; 1,16-hexadecanedioic acid (thapsic acid); 1,18-octadecanedioic acid; 1,4-cyclohexanedioic acid; isomers thereof or mixtures thereof. According to other non-limiting embodiments, the dicarboxlic acid may include mono- and polyunsaturated dicarboxylic acids.

Non-limiting examples of alicyclic dicarboxylic acids may include alicyclic dicarboxylic acids comprising from 4 to 20 carbon atoms in the alicyclic ring, including cyclic dicarboxylic acids in which the carboxylic acid moieties are attached directly to ring carbons and cyclic dicarboxylic acids in which at least one of the carboxylic acid moieties is at the end of a branched or unbranched $C_1$-$C_{10}$ alkyl chain, the other end of which is attached to a ring carbon.

Non-limiting examples of aromatic dicarboxylic acids may include, but are not limited to, phthalic acid, isophthalic acid, and terephthalic acid.

Non-limiting examples of hyperbranched polyester polyols and method of making the same that are suitable for use in forming the photochromic polyesters and other photochromic materials according to various non-limiting embodiments disclosed herein are described in U.S. Pat. No. 6,582,822, at col. 7, line 35 to col. 9, line 38 and Examples 1-13; and U.S. Pat. No. 6,884,845, at col. 8, line 65 to col. 9, line 61 and Example 1. The referenced disclosures are hereby specifically incorporated by reference herein.

Further, according to other non-limiting embodiments disclosed herein, the hyperbranched polyester polyol that is reacted with the indeno-fused naphthopyran to form a photochromic polyester according to various non-limiting embodiments disclosed herein may be a reaction product of:
  (a) a branched polyol comprising, on average, more than two hydroxyl groups (suitable non-limiting examples of which are provided above);
  (b) an aliphatic monocarboxylic acid comprising a chain of at least 10 carbon atoms (suitable non-limiting examples of which are provided above);
  (c) a dicarboxylic acid or a lactone, wherein the lactone may be a cyclic ester having from 3 to 10 ring carbons (as described herein) and wherein dicarboxylic acid may be at least one of:
    (i) an aliphatic dicarboxylic acid comprising represented by $HOOC—(CH_2)_m—COOH$, wherein m is an integer ranging from 8 to 32 (suitable non-limiting examples of which are provided herein),
    (ii) an alicyclic dicarboxylic acid comprising from 4 to 20 carbon atoms in the alicyclic ring (suitable non-limiting examples of which are provided herein), or (iii) an aromatic dicarboxylic acid comprising an from 6 to 10 carbon atoms in the aromatic ring (suitable non-limiting examples of which are provided above); and (d) an aliphatic diisocyanate represented by OCN—$(CR_2)_n$—NCO, wherein n is an integer ranging from 3 to 40 and each R may be, independently, H or $C_1$-$C_4$ alkyl.

Non-limiting examples of aliphatic diisocyanates represented by OCN—$(CR_2)_n$—NCO, wherein n is an integer ranging from 3 to 40 that may be used in forming hyperbranched polyester polyols that may be reacted with an indeno-fused naphthopyran to form a photochromic polyester according to various non-limiting embodiments disclosed herein include: substituted or unsubstituted diisocyanates wherein alkyl substitution may be methyl, ethyl, propyl, or butyl or combinations thereof, such as, for example but not limited to, 1,6-hexamethylene diisocyanate, 2,2,4-trimethyl hexamethylene diisocyanate, 2,4,4-trimethyl hexamethylene diisocyanate, and isomers and mixtures thereof. According to other embodiments, the diisocyanate may comprise one or more rings, such as an alkyl ring or an aromatic ring, for example, but not limited to, toluene diisocyanate, 4,4'-methylene-bis(cyclohexylisocyanate), isophorone diisocyanate, tetramethyl xylylene diisocyanate, 4,4'-diphenylmethylene diisocyanate, and mixtures thereof.

Alternatively, in place of the diisocyanate, in certain embodiments the hyperbranched polyester polyol may comprise a polyisocyanate. As used herein, the term "polyisocyanate" is intended to include blocked (or capped) polyisocyanates as well as unblocked polyisocyanates. Non-limiting examples of suitable polyisocyanates can include but are not limited to aliphatic polyisocyanates; ethylenically unsaturated polyisocyanates; alicyclic polyisocyanates; aromatic polyisocyanates wherein the isocyanate groups are not bonded directly to the aromatic ring, for example, α,α'-xylene diisocyanate; aromatic polyisocyanates wherein the isocyanate groups are bonded directly to the aromatic ring, for example, benzene diisocyanate; halogenated, alkylated, alkoxylated, nitrated, carbodiimide modified, urea modified, or biuret modified derivatives of these polyisocyanates; and dimerized and trimerized products of these polyisocyanates, such as, for example, allophanates. In a further non-limiting embodiment, the polyisocyanate can be chosen from polyisocyanate functional prepolymers and further combinations thereof with the aforementioned polyisocyanates. Such polyisocyanate prepolymers can be prepared as reaction products of polyisocyanates with polyols as known to those skilled in the art, for example, the reaction product of a polyol, such as trimethylolpropane, and a diisocyanate. If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. Non-limiting examples of the aforementioned polyisocyanates and capping agents are disclosed in U.S. Pat. No. 7,097,549 B2 at column 5, line 24 to column 8, line 52; and further polyisocyanates in U.S. Pat. No. 7,144,969 B2 at column 2, line 4 to column 3, line 22, which disclosures are incorporated herein by reference.

As discussed above, various non-limiting embodiments of the present disclosure relate to photochromic materials, and more particularly relate to a photochromic polymers comprising a reaction product of a hyperbranched polymer comprising, on average, more than two reactive groups, and an indeno-fused naphthopyran comprising a group that is adapted to react with a hydroxyl group of the hyperbranched polymer. For example, according to certain non-limiting embodiments, the present disclosure includes photochromic polyesters comprising the reaction product of a hyperbranched polyester polyol comprising, on average, more than two hydroxyl groups, and an indeno-fused naphthopyran comprising a group that is adapted to react with a hydroxyl group of the hyperbranched polyester polyol. According to one non-limiting embodiment, the indeno-fused naphthopyran comprising the group that is adapted to react with a reactive group of the hyperbranched polymer, such as a hydroxyl group of a hyperbranched polyester polyol, may be represented by formula (IA):

(IA)

wherein:
(a) PC represents an indeno-fused naphthopyran;
(b) n' represents an integer ranging from 1 to 8; and
(c) each S' independently represents a group represented by formula (IB):

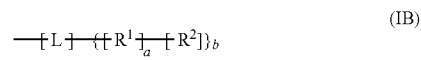

(IB)

wherein for each S'
(i) L independently represents a linking group that forms at least one covalent bond with a group $R^1$ or a group $R^2$ and at least one covalent bond with PC, the linking group being one of —O—, —N—, or —S—; or L may comprise a linear or branched organic bridging group comprising at least one linking group that forms at least one covalent bond with a group $R^1$ or a group $R^2$, the linking group being one of —O—, —N—, or —S—;
(ii) each a independently represents an integer ranging from 0 to 500;
(iii) each $R^1$ independently represents a ring-opened cyclic monomer;
(iv) each $R^2$ independently represents a residue of one of a diisocyanate a dicarboxylic acid, a diester, a diamide, an dianhydride, a bis-epoxide, a bis-chloroformate, or a residue of a compound comprising any two of these functional groups (an ester isocyanate, an ester acid, an epoxyamide, etc.), wherein the residue comprises at least one reactive group, such as, for example, an isocyanate, a carboxylic acid, an ester, an amide, an anhydride, an epoxide, or a chloroformate, that is adapted to react with a reactive group of the hyperbranched polymer, such as, for example, a hydroxyl group of a hyperbranched polyester polyol, an amino group of a hyperbranched polyamide polyamine, or a thiol group of a hyperbranched polythioester polythiol; and
(v) b represents an integer ranging from 1 to 20.

As discussed above, according to various non-limiting embodiments disclosed herein, for each group S', L may independently represent a linking group that forms at least one covalent bond with a group $R^1$ or a group $R^2$, the linking group independently being —O—, —N— or —S—; or L may comprise a linear or branched organic bridging group comprising at least one linking group that forms at least one covalent bond with a group $R^1$ or a group $R^2$, the linking group independently being —O—, —N—, or —S—. As used herein the term "linking group" refers to a group capable of forming at least one covalent bond. Further, as indicated above, L may comprise a linear or branched organic bridging group comprising one or more linking groups. For example, according to one non-limiting embodiment disclosed herein b may be 2 and L may be a linear or branched organic bridging group comprising two linking groups. More specifically, for example, L may comprise an organic bridging group having two linking —O— groups, each of which is linked to an $R^1$ or an $R^2$ group. According to still other non-limiting embodiments, the L group can be a bridging group comprising more than two linking groups. For example, while not limiting herein, as discussed above, b can range from 1 to 20, and L can be an organic bridging group comprising from 1 to 20 linking groups. According to other non-limiting embodiments, b can range from 1 to 16, from 1 to 10, or from 1 to 3. According to other non-limiting embodiments, b may be 1.

According to various non-limiting embodiments disclosed herein, wherein L is a linear or branched organic bridging group comprising at least one linking group, L may be one of: $C_1$-$C_{10}$ alkyloxy, $C_1$-$C_{10}$ alkylamino, $C_1$-$C_{10}$ alkylthio, $C_2$-$C_{20}$ beta-oxypoly(ethoxy), $C_3$-$C_{30}$ beta-oxypoly(propoxy), $C_4$-$C_{40}$ beta-oxypoly(butoxy), $C_2$-$C_{20}$ beta-aminopoly(ethoxy), $C_3$-$C_{30}$ beta-aminopoly(propoxy), $C_4$-$C_{40}$ beta-aminopoly(butoxy), $C_2$-$C_{20}$ beta-thiopoly(ethoxy), $C_3$-$C_{30}$ beta-thiopoly(propoxy), $C_4$-$C_{40}$ beta-thiopoly(butoxy), aryl $C_1$-$C_{10}$ alkyloxy, aryl $C_1$-$C_{10}$ alkylamino, aryl $C_1$-$C_{10}$ alkylthio, aryl $C_2$-$C_{20}$ beta-oxypoly(ethoxy), aryl $C_3$-$C_{30}$ beta-oxypoly(propoxy), aryl $C_4$-$C_{40}$ beta-oxypoly(butoxy), aryl $C_2$-$C_{20}$ beta-aminopoly(ethoxy), aryl $C_3$-$C_{30}$ beta-aminopoly(propoxy), aryl $C_4$-$C_{40}$ beta-aminopoly(butoxy), aryl $C_2$-$C_{20}$ beta-thiopoly(ethoxy), aryl $C_3$-$C_{30}$ beta-thiopoly(propoxy), aryl $C_4$-$C_{40}$ beta-thiopoly(butoxy), heterocyclic $C_1$-$C_{10}$ alkyloxy, heterocyclic $C_1$-$C_{10}$ alkylamino, heterocyclic $C_1$-$C_{10}$ alkylthio, heterocyclic $C_2$-$C_{20}$ beta-oxypoly(ethoxy), heterocyclic $C_3$-$C_{30}$ beta-oxypoly(propoxy), heterocyclic $C_4$-$C_{40}$ beta-oxypoly(butoxy), heterocyclic $C_2$-$C_{20}$ beta-aminopoly(ethoxy), heterocyclic $C_3$-$C_{30}$ beta-aminopoly(propoxy), heterocyclic $C_4$-$C_{40}$ beta-aminopoly(butoxy), heterocyclic $C_2$-$C_{20}$ beta-thiopoly(ethoxy), heterocyclic $C_3$-$C_{30}$ beta-thiopoly(propoxy), heterocyclic $C_4$-$C_{40}$ beta-thiopoly(butoxy), and combinations thereof. Non-limiting examples of aryl group include phenyl and naphthyl.

As used herein the term "heterocyclic" means a ring of atoms, wherein at least one atom forming the ring is different from the other atoms forming the ring, for example, a ring formed primarily of carbon atoms wherein at least one ring atom is not a carbon atom, such as, for example, a nitrogen atom, an oxygen atom, or a sulfur atom. Non-limiting examples of suitable heterocyclic groups may include: aza-indolyl, dibenzofuro, dibenzothieno, benzofuro, benzothieno, thieno, furo, dioxano, dioxolano, carbazolyl, benzoxazolyl, benzimidazolyl, benzthiazolyl, imidazolyl, indazolyl, isobenzoxazolyl, isooxazolyl, isoindolyl, isooxazolyl, isoquinolinyl, isothiazolyl, morpholino, oxadiazolyl, oxathiazolyl, piperidino, purinyl, phenazinyl, piperazino, pyrazinyl, pyrazolyl, pyridyl, pyrimidinyl, pyrrolidinyl, quinolinyl, isoquinolinyl, thiazolyl, triazinyl, thiomorpholino, thiadiazolyl, tetrahydroquinolinyl, and tetrahydroisoquinolinyl.

As discussed above, $R^1$ may represent a ring-opened cyclic monomer. As used herein, the term "ring-opening cyclic monomer" refers to a monomer having a ring (or cyclic) structure that is capable of undergoing a ring-opening reaction or ring-opening polymerization reaction. Further, as used herein, the term "ring-opening reaction" refers to the conversion of a cyclic monomer into its acyclic form, typically on reaction with an initiator. The term "ring-opening polymerization" refers to the formation of a chain of a plurality of ring-opened cyclic monomers. As used herein, the term "ring-opened cyclic monomer" means the acyclic form of a ring-opening cyclic monomer. As used herein, the term "plurality" means at least two. Examples of ring-opening cyclic monomers that can be used in conjunction with various non-limiting embodiments disclosed herein include, without limitation, cyclic esters (i.e., lactones), cyclic amides (i.e., lactams), cyclic carbonates, cyclic ethers, and cyclic siloxanes. Non-limiting examples of suitable ring-opening cyclic monomers are disclosed in U.S. patent application Ser. No. 10/903,770, filed Jul. 30, 2004, at paragraphs [0029] to [0033], which disclosure is hereby specifically incorporated by reference herein.

Specific non-limiting examples of suitable cyclic esters may include ϵ(epsilon)-caprolactone; t-butyl caprolactone; ζ(zeta)-enantholactone; δ(delta)-valerolactone; a monoalkyl δ-valerolactone, such as but not limited to monomethyl-, monoethyl-, and monohexyl-δ-valerolactone; the monoalkyl, dialkyl, and trialkyl-ϵ-caprolactones, such as but not limited to the monomethyl-, monoethyl-, monohexyl-, dimethyl-, di-n-propyl-, di-n-hexyl-, trimethyl-, triethyl-, and tri-n-ϵ-caprolactones, 5-nonyl-oxepan-2-one, 4,4,6- or 4,6,6-trimethyl-oxepan-2-one, 5-hydroxymethyl-oxepan-2-one; β(beta)-lactones, such as, but not limited, to β-propiolactone and β-butyrolactone; γ(gamma)-lactones, such as, but not limited to, γ-butyrolactone and pivalolactone; dilactones, such as, but not limited to, lactides, dilactides, glycolides (e.g., tetramethyl glycolides); or ketodioxanones, such as, but not limited, to 1,4-dioxan-2-one and 1,5-dioxepane-2-one.

Specific examples of suitable cyclic carbonates may include, without limitation, ethylene carbonate, 3-ethyl-3-hydroxylmethyl trimethylene carbonate, propylene carbonate, trimethylene carbonate, trimethylolpropane monocarbonate, 4,6-dimethyl-1,3-propylene carbonate, 2,2-dimethyl trimethylene carbonate, and 1,2-dioxepan-2-one.

Specific non-limiting examples of cyclic ethers may include, for example, ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyltetrahydrofuran, or 3-methyltetrahydrofuran.

Non-limiting examples of suitable cyclic siloxanes may include hexamethylcyclotrisiloxane or octamethylcyclotetrasiloxane.

Further, as indicated above, according to various non-limiting embodiments disclosed herein, the photochromic materials may have from 1 to 8 S' groups (i.e., n may range from 1 to 8 and in certain non-limiting embodiments, n may be 1), and each S' group may independently have no $R^1$ groups (i.e., a=0), one $R^1$ group (i.e., a=1) or a plurality of $R^1$ groups (i.e., a>1). Thus, according to various non-limiting embodiments disclosed herein, a may range from 0 to 500. According to other non-limiting embodiments, a may range from 1 to 100. According to still other non-limiting embodiments, a may range from 1 to 60.

As discussed above, $R^2$ may be the residue of one of a diisocyanate a dicarboxylic acid, a diester, a diamide, an anhydride, a bis epoxide, a bischloroformate, or a residue of a compound comprising any two of these functional groups (an esterisocyanate, an ester acid, an epoxyamide, etc.), wherein the residue comprises at least one reactive group, such as, for example, an isocyanate, a carboxylic acid, an ester, an amide, an anhydride, an epoxide, or a chloroformate, that is adapted to react with a reactive group of the hyperbranched polymer, such as, for example, a hydroxyl group of a hyperbranched polyester polyol, an amino group of a hyperbranched polyamide polyamine, or a thiol group of a hyperbranched polythioester polythiol. For example, according to one non-limiting embodiment, R may be the residue of an aliphatic diisocyanate, which may be represented by OCN—$(CR_2)_n$—NCO, wherein n is an integer ranging from 3 to 40, and may preferably range from 20 to 30 and wherein each R may independently be hydrogen or $C_1$-$C_6$ alkyl. Non-limiting examples of aliphatic diisocyanates represented by OCN—$(CR_2)_n$—NCO, wherein n is an integer ranging from 3 to 40 include those discussed above. In other non-limiting embodiments, $R_2$ may be the residue of a polyisocyanate, as described above.

According to other non-limiting embodiments, the photochromic materials of the present disclosure may be a thermally reversible photochromic compound comprising a group that is adapted to react with a hydroxyl group of the hyperbranched polyester polyol, and may comprise at least one photochromic group (PC) chosen from pyrans, oxazines, and fulgides. That is, according to other embodiments, another photochromic group (PC) may be used in place of the photochromic indeno-fused naphthopyran, as described herein.

Non-limiting examples of thermally reversible photochromic pyrans from which PC can be chosen and that can be used in conjunction with various non-limiting embodiments disclosed herein include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767 and as described herein, and heterocyclic-fused naphthopyrans, such as those disclosed in U.S. Pat. Nos. 5,723,072, 5,698,141, 6,153,126, and 6,022,497, which are hereby incorporated by reference; spiro-9-fluoreno[1,2-b] pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of thermally reversible photochromic oxazines from which PC can be chosen and that can be used in conjunction with various non-limiting embodiments disclosed herein include benzoxazines, naphthoxazines, and spiro-oxazines, e.g., spiro(indoline)naphthoxazines, spiro (indoline)pyridobenzoxazines, spiro(benzindoline)pyridobenzoxazines, spiro(benzindoline)naphthoxazines, spiro(indoline)benzoxazines, spiro(indoline)fluoranthenoxazine, and spiro(indoline)quinoxazine.

Non-limiting examples of thermally reversible photochromic fulgides from which PC can be chosen and that can be used in conjunction with various non-limiting embodiments disclosed herein include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

More particularly, according to various non-limiting embodiments disclosed herein wherein PC is an indeno-fused naphthopyran, the indeno-fused naphthopyran represented by PC may be an indeno[2',3':3,4]naphtho[1,2-b]pyran. As used herein, the term indeno[2',3':3,4]naphtho[1,2-b]pyran refers to a photochromic group that may be represented by the general structure (II) (below), and which comprises one or two group(s) bonded to the pyran ring at an available position adjacent the oxygen atom (i.e., indicated as the groups B and B' bonded at the 3-position in structure (II) below), which may aid in stabilizing the open-form of the indeno-fused naphthopyran. Non-limiting examples of groups that may be bonded to the pyran ring are described in more detail herein below with reference to the groups B and B'. Further, it will be appreciated by those skilled in the art that any available position in the structure (II) may be substituted or unsubstituted as required. Non-limiting examples of groups that may be bonded to available positions on the indeno[2',3':3,4]naphtho [1,2-b]pyran according to various non-limiting embodiments disclose herein are set forth herein below in detail.

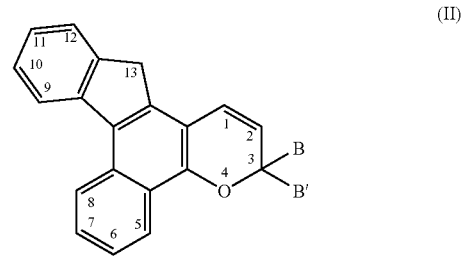

(II)

For example, according to various non-limiting embodiments of the present disclosure, the indeno-fused naphthopyran may be represented by the structure (III) shown below:

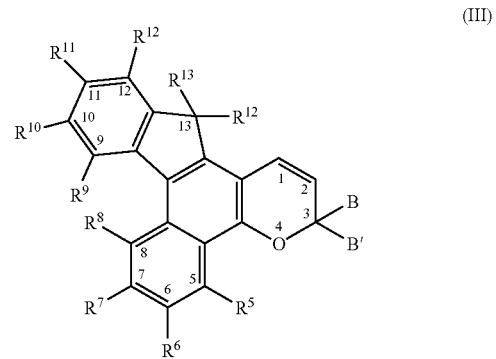

(III)

wherein the indeno-fused naphthopyran comprises at least one group S' as discussed herein. For example, according to one non-limiting embodiment, at least one of $R^{13}$ and $R^{14}$ may be the group S'. Other non-limiting examples of groups that B, B', and $R^5$-$R^{14}$ may represent are set forth below in more detail.

With continued reference to structure (III) above, non-limiting examples of groups that B and B' may each independently represent include:

(a) a metallocenyl group (such as those discussed below in more detail);

(b) an aryl group that is mono-substituted with a reactive substituent, a compatiblizing substituent (such as those discussed in more detail herein) or the group S' (discussed above);

(c) 9-julolidinyl, an unsubstituted, mono-, di- or tri-substituted aryl group chosen from phenyl and naphthyl, an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl and fluorenyl, wherein the aryl and heteroaromatic substituents are each independently: hydroxy, aryl, mono- or di-($C_1$-$C_{12}$)

alkoxyaryl, mono- or di-($C_1$-$C_{12}$)alkylaryl, haloaryl, $C_3$-$C_7$ cycloalkylaryl, $C_3$-$C_7$ cycloalkyl, $C_3$-$C_7$ cycloalkyloxy, $C_3$-$C_7$cycloalkyloxy($C_1$-$C_{12}$)alkyl, $C_3$-$C_7$cycloalkyloxy($C_1$-$C_{12}$)alkoxy, aryl($C_1$-$C_{12}$)alkyl, aryl($C_1$-$C_{12}$)alkoxy, aryloxy, aryloxy($C_1$-$C_{12}$)alkyl, aryloxy($C_1$-$C_{12}$)alkoxy, mono- or di-($C_1$-$C_{12}$)alkylaryl($C_1$-$C_{12}$)alkyl, mono- or di-($C_1$-$C_{12}$) alkoxyaryl($C_1$-$C_{12}$)alkyl, mono- or di-($C_1$-$C_{12}$)alkylaryl($C_1$-$C_{12}$)alkoxy, mono- or di-($C_1$-$C_{12}$)alkoxyaryl($C_1$-$C_{12}$)alkoxy, amino, mono- or di-($C_1$-$C_{12}$)alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_{12}$ alkyl, $C_1$-$C_{12}$ haloalkyl, $C_1$-$C_{12}$ alkoxy, mono($C_1$-$C_{12}$)alkoxy($C_1$-$C_{12}$)alkyl, acryloxy, methacryloxy, halogen or —C(=O)$R^{15}$, wherein $R^{15}$ is —O$R^{16}$, —N($R^{17}$)$R^{18}$, piperidino or morpholino, wherein $R^{16}$ represents a group, such as, allyl, $C_1$-$C_6$ alkyl, phenyl, mono($C_1$-$C_6$)alkyl substituted phenyl, mono($C_1$-$C_6$)alkoxy substituted phenyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl or $C_1$-$C_6$ haloalkyl, and $R^{17}$ and $R^{18}$ each independently represents a group, such as, $C_1$-$C_6$ alkyl, $C_5$-$C_7$ cycloalkyl or a substituted or an unsubstituted phenyl, wherein said phenyl substituents are independently $C_1$-$C_6$ alkyl or $C_1$-$C_6$ alkoxy;

(d) an unsubstituted or mono-substituted group chosen from pyrazolyl, imidazolyl, pyrazolinyl, imidazolinyl, pyrrolinyl, phenothiazinyl, phenoxazinyl, phenazinyl and acridinyl, said substituents being $C_1$-$C_{12}$ alkyl, $C_1$-$C_{12}$ alkoxy, phenyl or halogen;

(e) a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_e$— or —[O—($CH_2$)$_e$]$_f$—, wherein e is an integer ranging from 2 to 6 and f is an integer ranging from 1 to 50, and wherein the substituent is connected to an aryl group on another photochromic material;

(f) a group represented by:

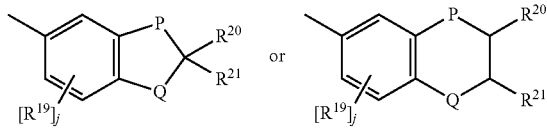

wherein P represents a group, such as, —$CH_2$— or —O—, Q represents a group, such as, —O— or substituted nitrogen, the substituted nitrogen substituents being hydrogen, $C_1$-$C_{12}$ alkyl or $C_1$-$C_{12}$ acyl, provided that when Q is substituted nitrogen, P is —$CH_2$—; each $R^{19}$ independently represents a group, such as, $C_1$-$C_{12}$ alkyl, $C_1$-$C_{12}$ alkoxy, hydroxy or halogen; $R^{20}$ and $R^{21}$ each independently represent a group, such as, hydrogen or $C_1$-$C_{12}$ alkyl; and j represents an integer ranging from 0 to 2; or (g) a group represented by:

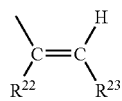

wherein $R^{22}$ represents a group, such as, hydrogen or $C_1$-$C_{12}$ alkyl, and $R^{23}$ represents a group, such as, an unsubstituted, mono- or di-substituted naphthyl, phenyl, furanyl or thienyl, wherein said naphthyl, phenyl, furanyl and thienyl substituents are independently $C_1$-$C_{12}$ alkyl, $C_1$-$C_{12}$ alkoxy or halogen.

Alternatively, B and B' may represent groups that together form a fluoren-9-ylidene or mono- or di-substituted fluoren-9-ylidene, each of said fluoren-9-ylidene substituents independently being $C_1$-$C_{12}$ alkyl, $C_1$-$C_{12}$ alkoxy or halogen.

Non-limiting examples of groups that $R^{13}$ and $R^{14}$ shown above in structure (III) may each independently represent include:

(a) the group S';

(b) a metallocenyl group (such as those discussed below in more detail);

(c) a reactive substituent or a compatiblizing substituent (such as those discussed below in more detail);

(d) a perhalogenated compound, wherein the perhalogenated compound is at least one of a perhalo($C_1$-$C_{10}$)alkyl, a perhalo($C_2$-$C_{10}$)alkenyl, a perhalo($C_2$-$C_{10}$)alkynyl, a perhalo ($C_1$-$C_{10}$)alkoxy or a perhalo($C_3$-$C_{10}$)cycloalkyl;

(e) a group represented by —O($CH_2$)$_h$($CX_2$)$_i$$CT_3$, wherein T represents halogen, X represents hydrogen or halogen, h represents an integer ranging from 1 to 10, and i represents an integer ranging from 1 to 10;

(f) a silicon-containing group represented by one of

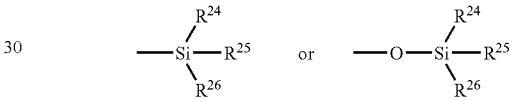

wherein $R^{24}$, $R^{25}$, and $R^{26}$ each independently represents a group, such as, $C_1$-$C_{10}$ alkyl, $C_1$-$C_{10}$ alkoxy, or phenyl;

(g) hydrogen, hydroxy, $C_1$-$C_6$ alkyl, chloro, fluoro, $C_3$-$C_7$ cycloalkyl, allyl or $C_1$-$C_8$ haloalkyl;

(h) morpholino, piperidino, pyrrolidino, an unsubstituted, mono- or di-substituted amino, wherein said amino substituents are independently $C_1$-$C_6$ alkyl, phenyl, benzyl or naphthyl;

(i) an unsubstituted, mono-, di- or tri-substituted aryl group chosen from phenyl, naphthyl, benzyl, phenanthryl, pyrenyl, quinolyl, isoquinolyl, benzofuranyl, thienyl, benzothienyl, dibenzofuranyl, dibenzothienyl, carbazolyl or indolyl, wherein said aryl group substituents are independently halogen, $C_1$-$C_6$ alkyl or $C_1$-$C_6$ alkoxy;

(j) —C(=O)$R^{27}$, wherein $R^{27}$ represents a group, such as, hydrogen, hydroxy, $C_1$-$C_6$ alkyl, $C_1$-$C_6$ alkoxy, amino, mono- or di-($C_1$-$C_6$)alkylamino, morpholino, piperidino, pyrrolidyl, an unsubstituted, mono- or di-substituted phenyl or naphthyl, an unsubstituted, mono- or di-substituted phenoxy, an unsubstituted, mono- or di-substituted phenylamino, wherein said phenyl, naphthyl, phenoxy, and phenylamino substituents are independently $C_1$-$C_6$ alkyl or $C_1$-$C_6$ alkoxy;

(k) —O$R^{28}$, wherein $R^{28}$ represents a group, such as: (i) $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_8$ chloroalkyl, $C_1$-$C_8$ fluoroalkyl, allyl or $C_1$-$C_6$ acyl, (ii) —CH($R^{29}$)$R^{30}$, wherein $R^{29}$ represents a group, such as, hydrogen or $C_1$-$C_3$ alkyl; and $R^{30}$ represents a group, such as, —CN, —C$F_3$ or —COO$R^{31}$, wherein $R^{31}$ represents a group, such as, hydrogen or $C_1$-$C_3$ alkyl, or (iii) —C(=O)$R^{32}$, wherein $R^{32}$ represents a group, such as, hydrogen, $C_1$-$C_6$ alkyl, $C_1$-$C_6$ alkoxy, amino, mono- or di-($C_1$-$C_6$)alkylamino, an unsubstituted, mono- or di-substituted phenyl or naphthyl, an unsubstituted, mono- or di-substituted phenoxy or an unsubstituted, mono- or di-substituted phenylamino, wherein said phenyl, naphthyl, phenoxy and phenylamino substituents are independently $C_1$-$C_6$ alkyl or $C_1$-$C_6$ alkoxy;

(l) a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_e$— or —[O—($CH_2$)$_e$]$_f$—, wherein e represents an integer ranging from 2 to 6 and f represents an integer ranging from 1 to 50, and wherein the substituent is connected to an aryl group of another photochromic material (e.g., an aryl group of an indeno-fused naphthopyran);

(m) —CH($R^{33}$)$_2$, wherein $R^{33}$ represents a group, such as, —CN or —COO$R^{34}$, wherein $R^{34}$ represents a group, such as, hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are independently $C_1$-$C_6$ alkyl or $C_1$-$C_6$ alkoxy; or (n) —CH($R^{35}$)$R^{36}$, wherein $R^{35}$ represents a group, such as, hydrogen, $C_1$-$C_6$ alkyl or an unsubstituted, mono- or di-substituted phenyl or naphthyl, wherein said phenyl and naphthyl substituents are independently $C_1$-$C_6$ alkyl or $C_1$-$C_6$ alkoxy, and $R^{36}$ represents a group, such as, —C(=O)O$R^{37}$, —C(=O)$R^{38}$ or —$CH_2$O$R^{39}$ wherein:

(i) $R^{37}$ represents a group, such as, hydrogen, $C_1$-$C_6$ alkyl, $C_3$-$C_7$ cycloalkyl, phenyl($C_1$-$C_3$)alkyl, mono($C_1$-$C_6$) alkyl substituted phenyl($C_1$-$C_3$)alkyl, mono($C_1$-$C_6$) alkoxy substituted phenyl($C_1$-$C_3$)alkyl or an unsubstituted, mono- or di-substituted phenyl or naphthyl, wherein said phenyl and naphthyl substituents are independently $C_1$-$C_6$ alkyl or $C_1$-$C_6$ alkoxy, (ii) $R^{38}$ hydrogen, $C_1$-$C_6$ alkyl, amino, mono($C_1$-$C_6$)alkylamino, di($C_1$-$C_6$) alkylamino, phenylamino, diphenylamino, (mono- or di-($C_1$-$C_6$)alkyl substituted phenyl) amino, (mono- or di-($C_1$-$C_6$)alkoxy substituted phenyl) amino, di(mono- or di-($C_1$-$C_6$)alkyl substituted phenyl) amino, di(mono- or di-($C_1$-$C_6$)alkoxy substituted phenyl)amino, morpholino, piperidino or an unsubstituted, mono- or di-substituted phenyl or naphthyl, wherein said phenyl and naphthyl substituents are independently $C_1$-$C_6$ alkyl or $C_1$-$C_6$ alkoxy, and (iii) $R^{39}$ represents a group, such as, hydrogen, —C(=O) $R^{37}$ (examples of groups that $R^{37}$ may represent are set forth above), $C_1$-$C_6$ alkyl, $C_1$-$C_3$ alkoxy ($C_1$-$C_6$)alkyl, phenyl($C_1$-$C_6$)alkyl, mono-alkoxy substituted phenyl ($C_1$-$C_6$)alkyl or an unsubstituted, mono- or di-substituted phenyl or naphthyl, wherein said phenyl and naphthyl substituents are independently $C_1$-$C_6$ alkyl or $C_1$-$C_6$ alkoxy.

Alternatively, $R^{13}$ and $R^{14}$ may each represent groups that together form an oxo group, a spiro-carbocyclic group containing 3 to 6 carbon atoms or a spiro-heterocyclic group containing 1 to 2 oxygen atoms and 3 to 6 carbon atoms including the spirocarbon atom, said spiro-carboxyclic and spiro-heterocyclic groups being annellated with 0, 1 or 2 benzene rings.

Further, in structure (III), $R^5$, $R^8$, $R^9$, and $R^{12}$ may each independently represent a group, such as:

(a) hydrogen, $C_1$-$C_6$ alkyl, chloro, fluoro, bromo, $C_3$-$C_7$ cycloalkyl or an unsubstituted, mono- or di-substituted phenyl, wherein said phenyl substituents are independently $C_1$-$C_6$ alkyl or $C_1$-$C_6$ alkoxy;

(b) —O$R^{40}$ or —OC(=O)$R^{40}$, wherein $R^{40}$ represents a group, such as, hydrogen, amine, alkylene glycol, polyalkylene glycol (e.g., as substituent having the general structure —[O—($C_tH_{2t}$)]$_u$—OR", wherein t and u are each independently integers ranging form 1 to 10, R" represents a group, such as, hydrogen, alkyl, a reactive substituent or a second photochromic material, non-limiting examples of which may be found in U.S. Pat. No. 6,113,814 at col. 3, lines 30-64, which disclosure is hereby specifically incorporated by reference herein), $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$) alkoxy substituted phenyl($C_1$-$C_3$)alkyl, ($C_1$-$C_6$)alkoxy($C_1$-$C_6$)alkyl, $C_3$-$C_7$ cycloalkyl, mono($C_1$-$C_4$)alkyl substituted $C_3$-$C_7$ cycloalkyl or an unsubstituted, mono- or di-substituted phenyl, wherein said phenyl substituents are independently $C_1$-$C_6$ alkyl or $C_1$-$C_6$ alkoxy;

(c) a reactive substituent or a compatiblizing substituent;

(d) a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_e$— or —[O—($CH_2$)$_e$]$_f$—, wherein e represents an integer ranging from 2 to 6 and f represents an integer ranging from 1 to 50, and wherein the substituent is connected to an aryl group on another photochromic material (e.g., an aryl group of an indeno-fused naphthopyran);

(e) —N($R^{41}$)$R^{42}$, wherein $R^{41}$ and $R^{42}$ each independently represents a group, such as, hydrogen, $C_1$-$C_8$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl and fluorenyl, $C_1$-$C_8$ alkylaryl, $C_3$-$C_8$ cycloalkyl, $C_4$-$C_{16}$ bicycloalkyl, $C_5$-$C_{20}$ tricycloalkyl or $C_1$-$C_{20}$ alkoxy($C_1$-$C_6$)alkyl, or $R^1$ and $R^2$ represent groups that come together with the nitrogen atom to form a $C_3$-$C_{20}$ hetero-bicycloalkyl ring or a $C_4$-$C_{20}$ hetero-tricycloalkyl ring; a nitrogen containing ring represented by:

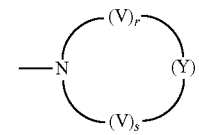

wherein each —V— is independently chose and represents a group, such as, —$CH_2$—, —CH($R^{43}$)—, —C($R^{43}$)$_2$—, —CH (aryl)-, —C(aryl)$_2$- and —C($R^{43}$)(aryl)-, wherein each $R^{43}$ independently represents a group, such as, $C_1$-$C_6$ alkyl, and each (aryl) independently represents a group, such as, phenyl or naphthyl; —Y— represents a group, such as, a group that —V— may represent, —O—, —S—, —S(O)—, —$SO_2$—, —NH—, —N($R^{43}$)— or —N(aryl)-; s represents an integer ranging from 1 to 3; and r represents an integer ranging from 0 to 3, provided that if r is 0, then —Y— represents is the same —V—;

(f) a group represented by:

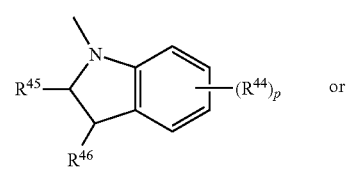

or

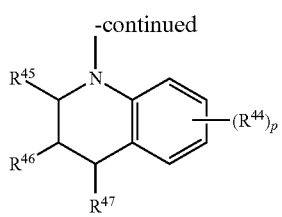

wherein each $R^{44}$ independently represents a group, such as, $C_1$-$C_6$ alkyl, $C_1$-$C_6$ alkoxy, fluoro or chloro; $R^{45}$, $R^{46}$ and $R^{47}$ each independently represents a group, such as, hydrogen, $C_1$-$C_6$ alkyl, phenyl or naphthyl, or $R^{45}$ and $R^{46}$ represents groups that together form a ring of 5 to 8 carbon atoms; and p represents an integer ranging from 0 to 3; or (g) a substituted or an unsubstituted $C_4$-$C_{18}$ spirobicyclic amine or a substituted or an unsubstituted $C_4$-$C_{18}$ spirotricyclic amine, wherein the substituents of the $C_4$-$C_{18}$ spirobicyclic amine or the $C_4$-$C_{18}$ spirotricyclic amine are independently aryl, $C_1$-$C_6$ alkyl, $C_1$-$C_6$ alkoxy or phenyl($C_1$-$C_6$) alkyl.

Non-limiting examples of groups that $R^7$ and $R^{10}$ (shown above in structure (III)) may each independently represent include:

(a) the group S';

(b) any of the groups discussed above with respect to $R^5$, $R^8$, $R^9$ and $R^{12}$; or (c) a metallocenyl group (such as those discussed below in more detail).

Non-limiting examples of groups that $R^6$ and $R^{11}$ in structure (III) may represent include:

(a) any of the groups discussed above with respect to $R^7$ and $R^{10}$, e.g., any of the groups discussed above with respect to $R^5$, $R^8$, $R^9$, and $R^{12}$ or a metallocenyl group;

(b) perfluoroalkyl or perfluoroalkoxy;

(c) —C(=O)$R^{48}$ or —SO$_2$$R^{48}$, wherein $R^{48}$ independently represents a group, such as, hydrogen, $C_1$-$C_6$ alkyl, —O$R^{49}$ or —N$R^{50}R^{51}$, wherein $R^{49}$, $R^{50}$ and $R^{51}$ each independently represents a group, such as, hydrogen, $C_1$-$C_6$ alkyl, $C_5$-$C_7$ cycloalkyl, alkylene glycol, polyalkylene glycol (e.g., as substituent having the general structure —[O—($C_tH_{2t}$)]$_u$—OR'', wherein t and u are each independently integers ranging form 1 to 10, R'' represents a group, such as, hydrogen, alkyl, a reactive substituent or a second photochromic material, non-limiting examples of which may be found in U.S. Pat. No. 6,113,814 at col. 3, lines 30-64, which disclosure is hereby specifically incorporated by reference herein) or an unsubstituted, mono- or di-substituted phenyl, wherein said phenyl substituents are independently $C_1$-$C_6$ alkyl or $C_1$-$C_6$ alkoxy;

(d) —C(=C($R^{52}$)$_2$)$R^{53}$, wherein each $R^{52}$ independently represents a group, such as, —C(=O)$R^{48}$, —O$R^{49}$, —OC(=O)$R^{49}$, —N$R^{50}R^{51}$, hydrogen, halogen, cyano, $C_1$-$C_6$ alkyl, $C_5$-$C_7$ cycloalkyl, alkylene glycol, polyalkylene glycol (e.g., as substituent having the general structure —[O—($C_tH_{2t}$)]$_u$—OR'', as discussed above) or an unsubstituted, mono- or di-substituted phenyl, wherein said phenyl substituents are independently $C_1$-$C_6$ alkyl or $C_1$-$C_6$ alkoxy, and $R^{53}$ represents a group, such as, hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are independently $C_1$-$C_6$ alkyl or $C_1$-$C_6$ alkoxy; or (e) —C≡C$R^{54}$ or —C≡N, wherein $R^{54}$ represents a group, such as, —C(=O)$R^{48}$, hydrogen, $C_1$-$C_6$ alkyl, $C_5$-$C_7$ cycloalkyl or an unsubstituted, mono- or di-substituted phenyl, wherein said phenyl substituents are independently $C_1$-$C_6$ alkyl or $C_1$-$C_6$ alkoxy.

Alternatively, according to various non-limiting embodiments disclosed herein wherein the photochromic material may be represented by structure (III) above, adjacent groups represented by $R^6$ and $R^7$ and/or adjacent groups represented by $R^{10}$ and $R^{11}$ may together form a group represented by:

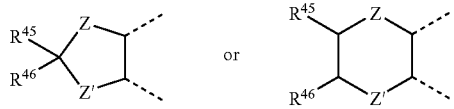

wherein Z and Z' may each independently represent oxygen or the group —N$R^{41}$— wherein $R^{41}$, $R^{45}$ and $R^{46}$ each represents a group such as those set forth above, or adjacent groups (e.g., $R^6$ and $R^7$ and/or $R^{10}$ and $R^{11}$) may together form an aromatic or heteroaromatic fused group, said fused group being benzo, indeno, dihydronaphthalene, indole, benzofuran, benzopyran or thianaphthene. For example, according to one non-limiting embodiment, $R^6$ and $R^7$ may come together to form a five- or six-membered dioxo ring (i.e., Z and Z' are both oxygen) wherein $R^{45}$ and $R^{46}$ may each independently represent hydrogen, $C_1$-$C_6$ alkyl, phenyl or naphthyl, or $R^{45}$ and $R^{46}$ may represent groups that together form a ring of 5 to 8 carbon atoms. According to one specific non-limiting embodiment, $R^6$ and $R^7$ come together to form a five- or six-membered dioxo ring wherein $R^{45}$ and $R^{46}$ are each hydrogen or $C_1$-$C_6$ alkyl.

As indicated above, according to various non-limiting embodiments disclosed herein, the indeno-fused naphthopyran may comprise a metallocenyl group. As used herein, the term "metallocene group" refers to a group in which two cyclopentadienyl ring ligands form a "sandwich" around a metal ion, wherein each cyclopentadienyl ring is bonded to the metal ion by a pentahapto ($\eta^5$) bonding structure. Metallocene groups have the general empirical formula ($C_5H_5$)$_2$M, where M is a metal ion having a +2 oxidation state. As used herein, the term "metallocenyl group" refers to a metallocene group that forms or is capable of forming at least one bond with at least one other group, such as, for example, a photochromic group. Specific, non-limiting examples of metallocenyl groups that may be used in connection with the photochromic materials according to various non-limiting embodiments disclosed herein include: ferrocenyl groups, titanocenyl groups, ruthenocenyl groups, osmocenyl groups, vanadocenyl groups, chromocenyl groups, cobaltocenyl groups, nickelocenyl groups, and di-π-cyclopentadienyl-manganese groups. According to one specific non-limiting embodiment, the metallocenyl group that is bonded to the indeno-fused naphthopyran at the 13-position is a ferrocenyl group.

According to various non-limiting embodiments disclosed herein wherein the photochromic material comprises a metallocenyl group (which may be bonded to the indeno-fused naphthopyran at the 13-position as discussed above, or another available position as discussed herein below), the metallocenyl group may be further substituted. For example, according to various non-limiting embodiments disclosed herein, the metallocenyl group may be represented by one of the following general structures (ii) or (iii) (wherein the dashed line represents an attachment to an indeno-fused naphthopyran, either directly or through a tether, such as, a $C_1$-$C_6$ alkyl, $C_1$-$C_6$ alkoxy, or polyalkylene glycol tether):

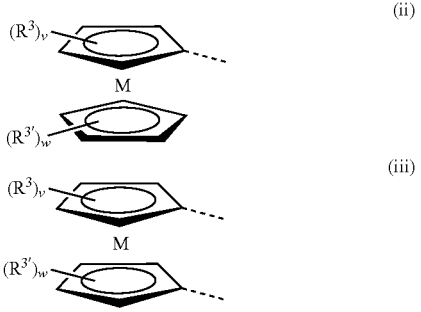

wherein M represents Ti, V, Cr, Mn, Fe, Ru, Os, Co or Ni; v and w each represent an integer from 0 to 3, each $R^3$ independently represents a group, such as, halogen, $C_1$-$C_3$ alkyl, phenyl($C_1$-$C_3$) alkyl, $C_1$-$C_3$ alkoxy, phenyl($C_1$-$C_3$) alkoxy, amino, vinyl or the group —C(O)$R^4$ wherein $R^4$ represents a group, such as, hydrogen, hydroxy, $C_1$-$C_3$ alkyl, phenyl; or two adjacent $R^3$ substituent groups may together form a benzo group; and each $R^{3'}$ may independently represent a group, such as, another photochromic group (for example, another indeno-fused naphthopyran, attached either directly or through a tether, as described above) or any group discussed above with respect to $R^3$. According to one non-limiting embodiment, M represents Ti, Cr, Fe or Ru. According to another non-limiting embodiment, M represents Fe. Non-limiting examples of photochromic materials and methods of making photochromic materials comprising a metallocenyl group that may be suitable for use in connection with various non-limiting embodiments of the present invention are disclosed at paragraphs [0019] to [0063] of U.S. application Ser. No. 11/443,838, filed May 31, 2006, entitled "Photochromic Materials Comprising Metallocenyl Groups", which disclosure is hereby specifically incorporated by reference herein.

As indicated above and discuss in more detail herein below, the photochromic materials according to various non-limiting embodiments disclosed herein may comprise a reactive substituent or a compatiblizing substituent. As used herein, the term "reactive substituent" means an arrangement of atoms, wherein a portion of the arrangement comprises a reactive moiety or a residue thereof. As used herein, the term "moiety" means a part or portion of an organic molecule that has a characteristic chemical property. As used herein, the term "reactive moiety" means a part or portion of an organic molecule that may react to form one or more bond(s) with a monomer, an intermediate in a polymerization reaction or with a polymer into which it has been incorporated. As used herein, the term "intermediate in a polymerization reaction" means any combination of two or more monomer units that are capable of reacting to form one or more bond(s) to additional monomer unit(s) to continue a polymerization reaction or, alternatively, reacting with a reactive moiety of the reactive substituent on the photochromic material. For example, although not limiting herein, the reactive moiety may react with an intermediate in a polymerization reaction of a monomer or oligomer as a co-monomer in the polymerization reaction or may react as, for example and without limitation, a nucleophile or electrophile, that adds into the intermediate. Alternatively, the reactive moiety may react with a group (such as, but not limited to a hydroxyl group) on a polymer.

As used herein, the term "residue of a reactive moiety" means that which remains after a reactive moiety has been reacted. For example, the reactive moiety can be reacted with a protecting group, a monomer, a polymer or an intermediate in a polymerization reaction. As used herein, the term "protecting group" means a group that is removably bonded to a reactive moiety that prevents the reactive moiety from participating in a reaction until the group is removed. Optionally, the reactive substituents according to various non-limiting embodiments disclosed herein may further comprise a linking group. As used herein, the term "linking group" means one or more group(s) or chain(s) of atoms that connect the reactive moiety to the photochromic material.

As used herein, the term "compatiblizing substituent" means an arrangement of atoms that can facilitate integration of the photochromic material into another material or solvent. For example, according to various non-limiting embodiments disclosed herein, the compatiblizing substituent may facilitate integration of the photochromic material into a hydrophilic material by increasing the miscibility of the photochromic material in water or a hydrophilic polymeric, oligomeric or monomeric material. According to other non-limiting embodiments, the compatiblizing substituent may facilitate integration of the photochromic material into a lipophilic material. Although not limiting herein, photochromic materials according to various non-limiting embodiments disclosed herein that comprise a compatiblizing substituent that facilitates integration into a hydrophilic material may be miscible in hydrophilic material at least to the extent of one gram per liter. Non-limiting examples of compatiblizing substituents include those substituents comprising a group -J, wherein -J represents the group -K (discussed below) or hydrogen.

Further, it should be appreciated that some substituents may be both a compatiblizing substituent and a reactive substituent. For example, a substituent that comprises hydrophilic linking group(s) that connects a reactive moiety to the photochromic material may be both a reactive substituent and a compatiblizing substituent. As used herein, such substituents may be termed as either a reactive substituent or a compatiblizing substituent.

Non-limiting examples of reactive and/or compatiblizing substituents that may be used in conjunction with the various non-limiting embodiments disclosed herein may be represented by:

| -A-D-E-G-J (v); | -G-E-G-J (vi); | -D-E-G-J (vii); |
| -A-D-J (viii); | -D-G-J (ix); | -D-J (x); |
| -A-G-J (xi); | -G-J (xii); or | -A-J (xiii). |

With reference to (v)-(xiii) above, non-limiting examples of groups that -A- may represent according to various non-limiting embodiments disclosed herein include —O—, —C(=O)—, —CH$_2$—, —OC(=O)— and —NHC(=O)—, provided that if -A- represents —O—, -A- forms at least one bond with -J.

Non-limiting examples of groups that -D- may represent according to various non-limiting embodiments include: (a) a diamine residue or a derivative thereof, wherein a first amino nitrogen of said diamine residue may form a bond with -A-, or a substituent or an available position on the indeno-fused naphthopyran, and a second amino nitrogen of said diamine residue may form a bond with -E-, -G- or -J; and (b) an amino alcohol residue or a derivative thereof, wherein an amino nitrogen of said amino alcohol residue may form a bond with -A-, or a substituent or an available position on the indeno-fused naphthopyran, and an alcohol oxygen of said amino alcohol residue may form a bond with -E-, -G- or -J. Alternatively, according to various non-limiting embodiments disclosed herein the amino nitrogen of said amino alcohol residue may form a bond with -E-, -G- or -J, and said alcohol oxygen of said amino alcohol residue may form a bond with -A-, or a substituent or an available position on the indeno-fused naphthopyran.

Non-limiting examples of suitable diamine residues that -D- may represent include an aliphatic diamine residue, a cyclo aliphatic diamine residue, a diazacycloalkane residue, an azacyclo aliphatic amine residue, a diazacrown ether residue, and an aromatic diamine residue. Specific non-limiting examples of diamine residues that may be used in conjunction with various non-limiting embodiments disclosed herein include the following:

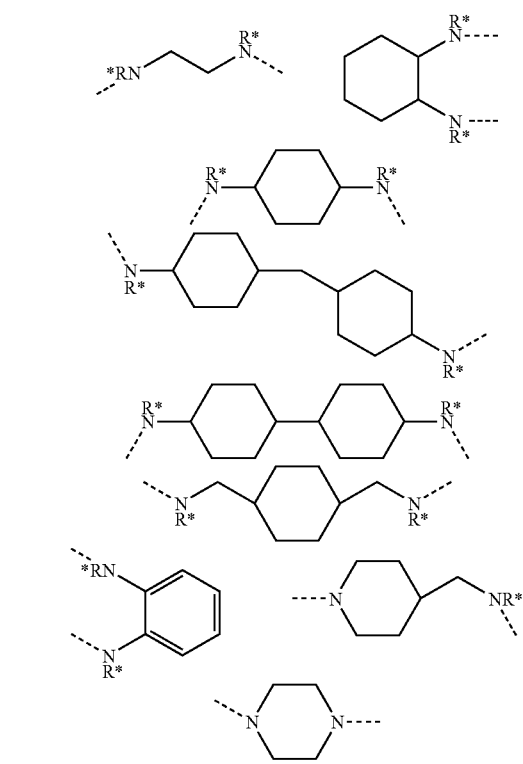

R* = H or alkyl

Non-limiting examples of suitable amino alcohol residues that -D- may represent include an aliphatic amino alcohol residue, a cyclo aliphatic amino alcohol residue, an azacyclo aliphatic alcohol residue, a diazacyclo aliphatic alcohol residue and an aromatic amino alcohol residue. Specific non-limiting examples of amino alcohol residues that may be used in conjunction with various non-limiting embodiments disclosed herein include the following:

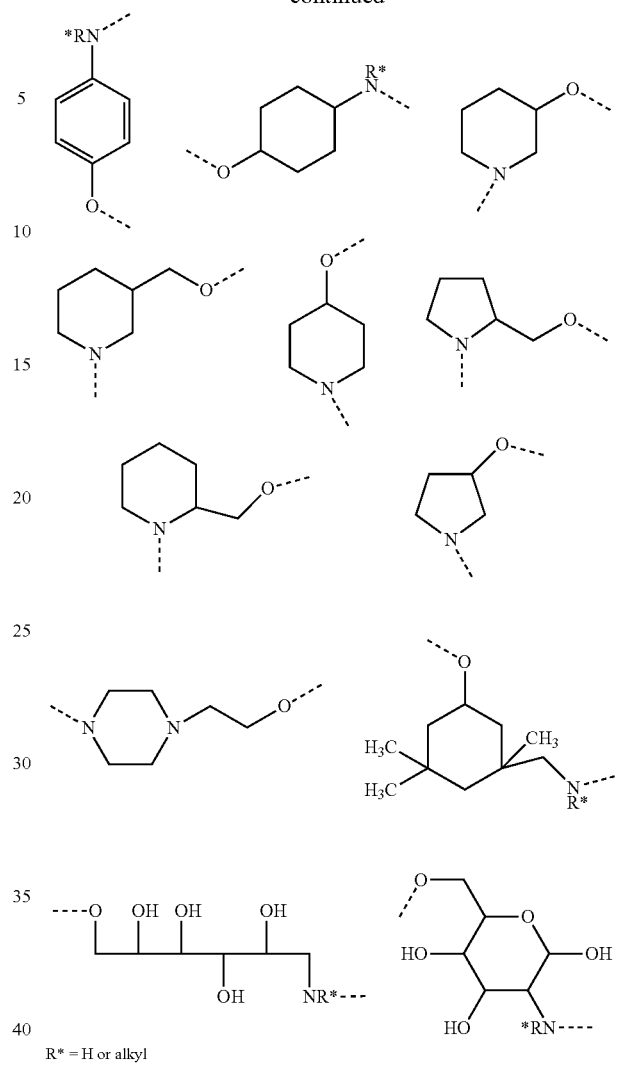

R* = H or alkyl

With continued reference to (v)-(xiii) above, according to various non-limiting embodiments disclosed herein, -E- may represent a dicarboxylic acid residue or a derivative thereof, wherein a first carbonyl group of said dicarboxylic acid residue may form a bond with -G- or -D-, and a second carbonyl group of said dicarboxylic acid residue may form a bond with -G-. Non-limiting examples of suitable dicarboxylic acid residues that -E- may represent include an aliphatic dicarboxylic acid residue, a cycloaliphatic dicarboxylic acid residue and an aromatic dicarboxylic acid residue. Specific non-limiting examples of dicarboxylic acid residues that may be used in conjunction with various non-limiting embodiments disclosed herein include the following:

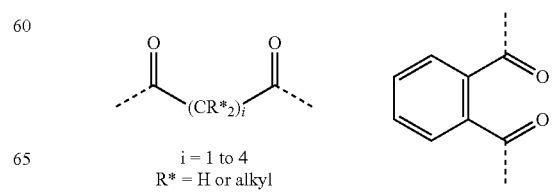

i = 1 to 4
R* = H or alkyl

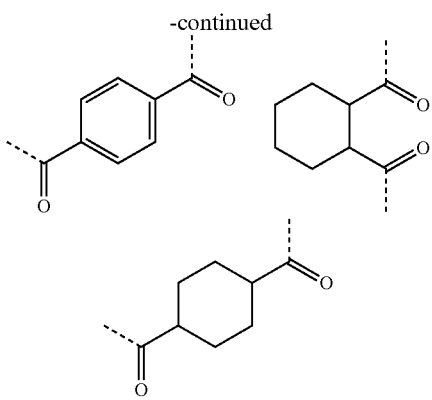

According to various non-limiting embodiments disclosed herein, -G- may represent: (a) a group —[(OC$_2$H$_4$)$_x$(OC$_3$H$_6$)$_y$(OC$_4$H$_8$)$_z$]—O—, wherein x, y and z are integers that each independently range from 0 to 50, and a sum of x, y, and z ranges from 1 to 50; (b) a polyol residue or a derivative thereof, wherein a first polyol oxygen of said polyol residue may form a bond with -A-, -D-, -E- or a substituent or an available position on the indeno-fused naphthopyran and a second polyol oxygen of said polyol may form a bond with -E- or -J; or (c) a combination of (a) and (b), wherein the first polyol oxygen of the polyol residue forms a bond with a group —[(OC$_2$H$_4$)$_x$(OC$_3$H$_6$)$_y$(OC$_4$H$_8$)$_z$]— (i.e., to form the group —[(OC$_2$H$_4$)$_x$(OC$_3$H$_6$)$_y$(OC$_4$H$_8$)$_z$]—O—), and the second polyol oxygen forms a bond with -E- or -J. Non-limiting examples of suitable polyol residues that -G- may represent include an aliphatic polyol residue, a cyclo aliphatic polyol residue and an aromatic polyol residue.

Specific non-limiting examples of polyols from which the polyol residues that -G- may represent may be formed according to various non-limiting embodiments disclosed herein include: (a) low molecular weight polyols having an average molecular weight less than 500, such as, but not limited to, those set forth in U.S. Pat. No. 6,555,028 at col. 4, lines 48-50, and col. 4, line 55 to col. 6, line 5, which disclosure is hereby specifically incorporated by reference herein; (b) polyester polyols, such as, but not limited to, those set forth in U.S. Pat. No. 6,555,028 at col. 5, lines 7-33, which disclosure is hereby specifically incorporated by reference herein; (c) polyether polyols, such as, but not limited to, those set forth in U.S. Pat. No. 6,555,028 at col. 5, lines 34-50, which disclosure is hereby specifically incorporated by reference herein; (d) amide-containing polyols, such as, but not limited to, those set forth in U.S. Pat. No. 6,555,028 at col. 5, lines 51-62, which disclosure is hereby specifically incorporated by reference; (e) epoxy polyols, such as, but not limited to, those set forth in U.S. Pat. No. 6,555,028 at col. 5 line 63 to col. 6, line 3, which disclosure is hereby specifically incorporated by reference herein; (f) polyhydric polyvinyl alcohols, such as, but not limited to, those set forth in U.S. Pat. No. 6,555,028 at col. 6, lines 4-12, which disclosure is hereby specifically incorporated by reference herein; (g) urethane polyols, such as, but not limited to, those set forth in U.S. Pat. No. 6,555,028 at col. 6, lines 13-43, which disclosure is hereby specifically incorporated by reference herein; (h) polyacrylic polyols, such as, but not limited to, those set forth in U.S. Pat. No. 6,555,028 at col. 6, lines 43 to col. 7, line 40, which disclosure is hereby specifically incorporated by reference herein; (i) polycarbonate polyols, such as, but not limited to, those set forth in U.S. Pat. No. 6,555,028 at col. 7, lines 41-55, which disclosure is hereby specifically incorporated by reference herein; and (j) mixtures of such polyols.

Referring again to (v)-(xiii) above, according to various non-limiting embodiments disclosed herein -J may represent a group -K, wherein -K represents a group, such as, but not limited to, —CH$_2$COOH, —CH(CH$_3$)COOH, —C(O)(CH$_2$)$_w$·COOH, —C$_6$H$_4$SO$_3$H, —C$_5$H$_{10}$SO$_3$H, —C$_4$H$_8$SO$_3$H, —C$_3$H$_6$SO$_3$H, —C$_2$H$_4$SO$_3$H and —SO$_3$H, wherein w' represents an integer ranging from 1 to 18. According to other non-limiting embodiments, -J may represent hydrogen that forms a bond with an oxygen or a nitrogen of linking group to form a reactive moiety, such as —OH or —NH. For example, according to various non-limiting embodiments disclosed herein, -J may represent hydrogen, provided that if -J represents hydrogen, -J is bonded to an oxygen of -D- or -G-, or a nitrogen of -D-.

According to still other non-limiting embodiments, -J may represent a group -U or residue thereof, wherein -U may represent a reactive moiety. For example, according to various non-limiting embodiments disclosed herein -U may represent a group, such as, but not limited to, acryl, methacryl, crotyl, 2-(methacryloxy)ethylcarbamyl, 2-(methacryloxy)ethoxycarbonyl, 4-vinylphenyl, vinyl, 1-chlorovinyl or epoxy. As used herein, the terms acryl, methacryl, crotyl, 2-(methacryloxy)ethylcarbamyl, 2-(methacryloxy)ethoxycarbonyl, 4-vinylphenyl, vinyl, 1-chlorovinyl, and epoxy refer to the following structures:

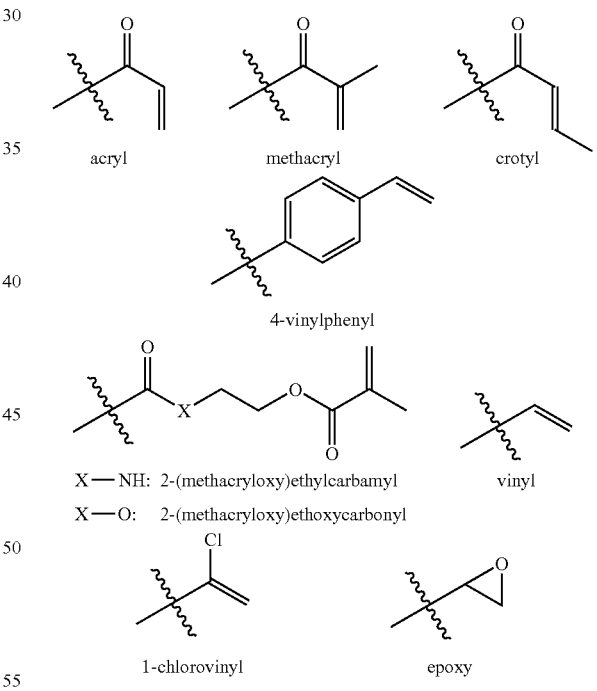

As previously discussed, -G- may represent a residue of a polyol, which is defined herein to include hydroxy-containing carbohydrates, such as those set forth in U.S. Pat. No. 6,555,028 at col. 7, line 56 to col. 8, line 17, which disclosure is hereby specifically incorporated by reference herein. The polyol residue may be formed, for example and without limitation herein, by the reaction of one or more of the polyol hydroxyl groups with a precursor of -A-, such as a carboxylic acid or a methylene halide, a precursor of polyalkoxylated group, such as polyalkylene glycol, or a hydroxyl substituent of the indeno-fused naphthopyran. The polyol may be represented by R'—(OH)$_g$ and the residue of the polyol may be represented by the formula —O—R'—(OH)$_{g-1}$, wherein R' is the backbone or main chain of the polyhydroxy compound and g is at least 2.

Further, as discussed above, one or more of the polyol oxygens of -G- may form a bond with -J (i.e., forming the group -G-J). For example, although not limiting herein, wherein the reactive and/or compatiblizing substituent comprises the group -G-J, if -G- represents a polyol residue and -J represents a group -K that contains a carboxyl terminating group, -G-J may be produced by reacting one or more polyol hydroxyl groups to form the group -K (for example as discussed with respect to Reactions B and C at col. 13, line 22 to col. 16, line 15 of U.S. Pat. No. 6,555,028, which disclosure is hereby specifically incorporated by reference herein) to produce a carboxylated polyol residue. Alternatively, if -J represents a group -K that contains a sulfo or sulfono terminating group, although not limiting herein, -G-J may be produced by acidic condensation of one or more of the polyol hydroxyl groups with HOC$_6$H$_4$SO$_3$H; HOC$_5$H$_{10}$SO$_3$H; HOC$_4$H$_8$SO$_3$H; HOC$_3$H$_6$SO$_3$H; HOC$_2$H$_4$SO$_3$H; or H$_2$SO$_4$, respectively. Further, although not limiting herein, if -G- represents a polyol residue and -J represents a group -U chosen from acryl, methacryl, 2-(methacryloxy)ethylcarbamyl and epoxy, -U may be added by condensation of the polyol residue with acryloyl chloride, methacryloyl chloride, 2-isocyanatoethyl methacrylate or epichlorohydrin, respectively.

Further, although not limiting herein, where the photochromic material comprises two or more reactive substituents, two or more compatiblizing substituents or a combination of reactive substituents and compatiblizing substituents, each substituent may be the same or different and may be independently chosen from those reactive and/or compatiblizing substituents discussed above. Additional examples of reactive and/or compatiblizing substituents and information regarding methods of forming such substituents on photochromic materials are provided at paragraphs [0051] to [0067] of U.S. patent application Ser. No. 11/102,279; U.S. patent application Ser. No. 11/102,280, at paragraphs [0017] to [0045]; U.S. Pat. No. 6,555,028, at col. 3, line 45 to col. 4, line 26; and U.S. Pat. No. 6,113,814 at col. 3, lines 30-64, which disclosures are hereby specifically incorporated by reference herein.

Other non-limiting embodiments of the present disclosure provide a photochromic polymer comprising a hyperbranched polymer and, on average, at least two photochromic compounds (such as any of those as described above) bonded to the hyperbranched polymer. In certain non-limiting embodiments, the at least two photochromic compounds may be at least two indeno-fused naphthopyrans. For example, according to certain non-limiting embodiment, the present disclosure provides for a photochromic polyester comprising a hyperbranched polyester as described herein, and on average, at least two photochromic indeno-fused naphthopyrans bonded to the hyperbranched polyester. For example, according to one non-limiting embodiment, the photochromic polyester may comprise at least two photochromic indeno-fused naphthopyrans bonded to the hyperbranched polyester, wherein each of the indeno-fused naphthopyrans bonded to the branched polyester may be the same or different and may be represented by formula (XIVA):

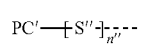
(XIVA)

wherein:
(a) PC' represents a photochromic compound, such as an indeno-fused naphthopyran;
(b) n" represents an integer ranging from 1 to 8; and
(c) each S" independently represents a group represented by formula (XIVB):

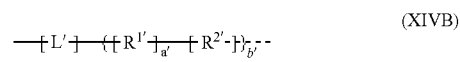
(XIVB)

wherein for each S"
(i) each L' may independently represent a linking group that forms at least one covalent bond with a group $R^{1'}$ or a group $R^{2'}$ and at least one covalent bond with PC', the linking group being —O—, —N—, or —S—; or L' may comprise a linear or branched organic bridging group comprising a linking group that forms at least one covalent bond with a group $R^{1'}$ or a group $R^{2'}$, the linking group being —O—, —N—, or —S—;
(ii) each a' independently represents an integer ranging from 0 to 500;
(iii) each $R^{1'}$ independently represents a ring-opened cyclic monomer;
(iv) each $R^{2'}$ independently a residue of one of a diisocyanate a dicarboxylic acid, a diester, a diamide, a dianhydride, a bis-epoxide, a bischloroformate, or a residue of a compound comprising any two of these functional groups (an ester isocyanate, an ester acid, an epoxyamide, etc.), wherein the residue comprises at least one of a urethane group, an ester group, an amide group, an ether group, a thio ester group, a thio ether group, a urea group, or a carbamate group, that forms a bond with the hyperbranched polymer; and
(v) b' represents an integer ranging from 1 to 20.

Non-limiting examples of groups which L' and $R^{1'}$ (in formula (XIVB)) may represent include those discussed above that L and $R^1$ (discussed with respect to formula (IB)) may represent.

As discussed above, $R^{2'}$ (in formula (XIVB)) may represent a residue of one of a diisocyanate a dicarboxylic acid, a diester, a diamide, an anhydride, a bis expoxide, a bischloroformate, or a residue of a compound comprising any two of these functional groups (an ester isocyanate, an ester acid, an epoxyamide, etc.), wherein the residue comprises at least one of a urethane group, an ester group, an amide group, an ether group, a thio ester group, a thio ether group, a urea group, or a carbamate group, that forms a bond with the hyperbranched polymer. For example, in certain embodiments wherein the residue forms a bond with a hydroxyl group of a hyperbranched polyol, the residue may comprise one of a urethane group, an ester group, an ether group, or a carbamate group. Alternatively, in various embodiments wherein the residue forms a bond with an amino group of a hyperbranched polyamine, the residue may comprise one of an amide group, an amide group, or a urea group. In still other embodiments wherein the residue forms a bond with a thiol group of a hyperbranched polythiol, the residue may comprise one of a thio ester group or a thio ether group.

Further, as discussed above, according to various non-limiting embodiments, the PC' represents an indeno-fused naphthopyran. According to these non-limiting embodiments, PC' may be an indeno[2',3':3,4]naphtho[1,2-b]pyran. For example, according to various non-limiting embodiments of the present disclosure, the indeno-fused naphthopyran may be represented by the structure of PC as shown in structure (III) above, provided that, instead of the indeno-fused naphthopyran comprising a group S' as discussed above with respect to structure (III), the indeno-fused naphthopyran according to these non-limiting embodiments comprises at least one group S", as set forth herein. For example, according to one non-limiting embodiment, at least one of $R^{13}$ and $R^{14}$ (shown in structure (III) above) may be the group S". Various non-limiting examples of other groups that B, B', and $R^5$-$R^{14}$ may represent are discussed above with respect to structure (III).

Still other non-limiting embodiments provide a photochromic material represented by formula (XVA):

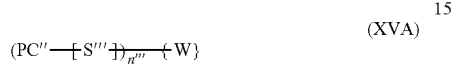
(XVA)

wherein:
(a) W represents a hyperbranched polymer;
(b) n''' represents an integer ranging from 2 to 100;
(c) each PC" independently represents a photochromic compound, such as an indeno-fused naphthopyran;
(d) each S''' independently represents a group represented by formula (XVB)

(XVB)

wherein
(i) each L" may independently represent a linking group that forms at least one covalent bond with a group $R^{1'''}$ or a group $R^{2''}$ and at least one covalent bond with PC", the linking group being —O—, —N—, or —S—; or L" may comprise a linear or branched organic bridging group comprising a linking group that forms at least one covalent bond with a group $R^{1'''}$ or a group $R^{2''}$, the linking group being —O—, —N—, or —S—;
(ii) each a" independently represents an integer ranging from 0 to 500;
(iii) each $R^{1'''}$ independently represents a ring-opened cyclic monomer;
(iv) each $R^{2''}$ independently represents a residue of one of a diisocyanate a dicarboxylic acid, a diester, a diamide, a dianhydride, a bis-epoxide, a bischloroformate, or a residue of a compound comprising any two of these functional groups (an ester isocyanate, an ester acid, an epoxyamide, etc.), wherein the residue comprises at least one of a urethane group, an ester group, an amide group, an ether group, a thio ester group, a thio ether group, a urea group, or a carbamate group, that forms a bond with a reactive residue on W; and
(v) each b" independently represents an integer ranging from 1 to 20.

Non-limiting examples of hyperbranched polymers that W shown above in structure (XVA) may represent include hyperbranched polyester polyols, hyperbranched polyamide polyamines, or hyperbranched polythioester polythiols discussed above. According to certain non-limiting embodiments wherein W may be a hyperbranched polyester polyol, the hyperbranched polyester polyols may be the reaction product of:
(a) a branched polyol comprising, on average, more than two hydroxyl groups;
(b) an aliphatic monocarboxylic acid comprising a chain of at least 10 carbon atoms; and
(c) a dicarboxylic acid or a lactone, wherein the lactone may be a cyclic ester having from 3 to 10 ring carbons and wherein dicarboxylic acid may be at least one of:
  (i) an aliphatic dicarboxylic acid comprising represented by HOOC—$(CH_2)_m$—COOH, wherein m is an integer ranging from 8 to 32, or
  (ii) an alicyclic dicarboxylic acid comprising from 4 to 20 carbon atoms in the alicyclic ring, or
  (iii) an aromatic dicarboxylic acid comprising an from 6 to 10 carbon atoms in the aromatic ring; or
the reaction product of:
(a) a branched polyol comprising, on average, more than two hydroxyl groups;
(b) an aliphatic monocarboxylic acid comprising a chain of at least 10 carbon atoms;
(c) a dicarboxylic acid or a lactone, wherein the lactone may be a cyclic ester having from 3 to 10 ring carbons and wherein dicarboxylic acid may be at least one of:
  (i) an aliphatic dicarboxylic acid comprising represented by
  (ii) HOOC—$(CH_2)_m$—COOH, wherein m is an integer ranging from 8 to 32, or
  (iii) an alicyclic dicarboxylic acid comprising from 4 to 20 carbon atoms in the alicyclic ring, or
  (iii) an aromatic dicarboxylic acid comprising an from 6 to 10 carbon atoms in the aromatic ring; and
(d) an aliphatic polyisocyanate (as describe above), such as a diisocyanate represented by OCN—$(CR_2)_n$—NCO, wherein n is an integer ranging from 3 to 40 and each R may be, independently, H or $C_1$-$C_4$ alkyl.

Non-limiting examples of polyols, monocarboxylic acids, dicarboxylic acid, and diisocyanates that may be useful in forming the hyperbranched polyester polyols are set forth above in detail.

Non-limiting examples of groups which L" and $R^{1'''}$ (in formula (XVB)) may represent include those discussed above for L and $R^1$ (in formula (IB)). Non-limiting examples of groups that $R^{2''}$ (in formula (XVB)) may represent include those discussed above for $R^{2'}$ (in formula (XIVB)). Further, according to these non-limiting embodiments where PC" represents an indeno-fused naphthopyran, the indeno-fused naphthopyran represented by PC" (in formula (XVA)) may be an indeno[2',3':3,4]naphtho[1,2-b]pyran. For example, according to various non-limiting embodiments of the present disclosure, the indeno-fused naphthopyran may be represented by the structure PC in structure (III) shown above provided that, instead of the indeno-fused naphthopyran comprising a group S' as discussed above with respect to structure (III), the indeno-fused naphthopyran according to these non-limiting embodiments comprises at least one group S'''. For example, according to one non-limiting embodiment, at least one of $R^{13}$ and $R^{14}$ (shown in structure (III) above) may be the group S'''. Various non-limiting examples of other groups that B, B', and $R^5$-$R^{14}$ may represent are discussed above with respect to structure (III).

As discussed above, the photochromic materials (e.g., the photochromic polymers, including photochromic polyesters) according to various non-limiting embodiments disclosed herein may be incorporated into at least a portion of an organic material, such as a polymeric, oligomeric or monomeric material to form a photochromic composition, which photochromic composition may be used, for example and without limitation, to form photochromic articles, such as optical elements, and coating compositions that may be applied to various substrates. As used herein, the terms "polymer" and "polymeric material" refer to homopolymers and copolymers (e.g., random copolymers, block copolymers, and alternating copolymers), as well as blends and other combinations thereof. As used herein, the terms "oligomer" and "oligomeric material" refer to a combination of two or more monomer units that is capable of reacting with additional monomer unit(s). As used herein, the term "incorporated into" means physically and/or chemically combined with. For example, the photochromic materials according to various non-limiting embodiments disclosed herein may be physically combined with at least a portion of an organic material, for example and without limitation, by mixing or imbibing the photochromic material into the organic material; and/or chemically combined with at least a portion of an organic material, for example and without limitation, by reacting a free hydroxyl group of the photochromic material with a free isocyanate group on the organic material or precursor thereof, or another reactive group on the organic material or precursor thereof that is reactive with the free hydroxyl group of the photochromic material.

Further, it is contemplated that the photochromic materials according to various non-limiting embodiments disclosed herein may each be used alone in the photochromic compositions and articles disclosed herein, or may be used in combination with other photochromic materials according to various non-limiting embodiments disclosed herein, or in combination with an appropriate complementary conventional photochromic material. For example, the photochromic materials according to various non-limiting embodiments disclosed herein may be used in conjunction with conventional photochromic materials having activated-state form absorption maxima within the range of 300 to 1000 nanometers. Further, the photochromic materials according to various non-limiting embodiments disclosed herein may be used in conjunction with a complementary conventional polymerizable or a compatibilized photochromic material, such as for example, those disclosed in U.S. Pat. No. 6,113,814 (at col. 2, line 39 to col. 8, line 41), and U.S. Pat. No. 6,555,028 (at col. 2, line 65 to col. 12, line 56), which disclosures are hereby specifically incorporated by reference herein.

As discussed above, according to various non-limiting embodiments disclosed herein, the photochromic compositions (as well as the photochromic articles discussed herein) may contain a mixture of photochromic materials. For example, although not limiting herein, mixtures of photochromic materials may be used to attain certain activated colors, such as a near neutral gray or near neutral brown. See, for example, U.S. Pat. No. 5,645,767, col. 12, line 66 to col. 13, line 19, which describes the parameters that define neutral gray and brown colors and which disclosure is specifically incorporated by reference herein.

Various non-limiting embodiments disclosed herein provide a photochromic composition comprising an organic material, the organic material being at least one of polymeric material, an oligomeric material and a monomeric material, and a photochromic material according to any of the non-limiting embodiments of set forth above incorporated into at least a portion of the organic material. According to various non-limiting embodiments disclosed herein, the photochromic material may be incorporated into a portion of the organic material by blending and/or bonding the photochromic material with the organic material or a precursor thereof. As used herein with reference to the incorporation of photochromic materials into an organic material, the terms "blending" and "blended" mean that the photochromic material is intermixed or intermingled with the at least a portion of the organic material, but not bonded to the organic material. Further, as used herein with reference to the incorporation of photochromic materials into an organic material, the terms "bonding" or "bonded" mean that the photochromic material is linked to a portion of the organic material or a precursor thereof. For example, although not limiting herein, the photochromic material may be linked to the organic material through a reactive substituent such as those as discussed above.

According to various non-limiting embodiments disclosed herein wherein the organic material is a polymeric material, the photochromic material may be incorporated into at least a portion of the polymeric material, or may be incorporated into at least a portion of the monomeric material or oligomeric material from which the polymeric material is formed. For example, one non-limiting embodiment disclosed herein provides a photochromic composition comprising a photochromic material according to any of the non-limiting embodiments discussed above, and an organic host material, wherein the photochromic material is bonded to at least a portion of the organic host material. According to this non-limiting embodiment, the photochromic material may be bonded to an organic host material, such as a monomer, oligomer, or polymer, by reacting a free hydroxyl group of the photochromic material with a group on the organic host material that is reactive with the free hydroxyl group.

Examples of organic host materials having groups that may be reactive with the free hydroxyl group include, without limitation, polyurethanes having free isocyanate groups, carboxylate groups, anhydride groups, epoxy groups, or chloroformate groups.

Although not limiting herein, it has been observed by the inventors that bonding the photochromic materials according to various non-limiting embodiments disclosed herein to at least a portion of an organic matrix material (for example, a polyurethane) into which the photochromic material is incorporated, the migration of the photochromic material from the organic host material may be reduced. As previously discussed, migration of photochromic materials from the bulk of a photochromic composition to the surface of the compositions may result in deterioration of the photochromic performance properties of the photochromic composition, such as, for example, increases in the time required for coloration and/or bleaching.

One specific non-limiting embodiment of the present disclosure provides a photochromic composition comprising a photochromic polyester according to any of the various non-limiting embodiments disclosed herein and a polyurethane, wherein the photochromic polyester may be bonded to at least a portion of the polyurethane. For example, according to this non-limiting embodiment, the photochromic polyester may form a urethane linkage with the polyurethane by reacting a free hydroxyl group on the photochromic polyester with a free isocyanate group on the polyurethane. According to other non-limiting embodiments wherein the photochromic composition may comprise a photochromic polyamide, as described herein, and a polyurethane, the photochromic polyester may be bonded to the polyurethane, for example, by reacting a free amino group on the photochromic polyamide with a free isocyanate group on the polyurethane.

As discussed above, the photochromic compositions according to various non-limiting embodiments disclosed herein may comprise an organic material chosen from a polymeric material, an oligomeric material and/or a monomeric material. Examples of polymeric materials that may be used in conjunction with various non-limiting embodiments disclosed herein include, without limitation: polymers of bis (allyl carbonate) monomers; diethylene glycol dimethacrylate monomers; diisopropenyl benzene monomers; ethoxylated bisphenol A dimethacrylate monomers; ethylene glycol bismethacrylate monomers; poly(ethylene glycol) bismethacrylate monomers; ethoxylated phenol bismethacrylate monomers; alkoxylated polyhydric alcohol acrylate monomers, such as ethoxylated trimethylol propane triacrylate monomers; urethane acrylate monomers; vinylbenzene monomers; and styrene. Other non-limiting examples of suitable polymeric materials include polymers of polyfunctional, e.g., mono-, di- or multi-functional, acrylate and/or methacrylate monomers; poly($C_1$-$C_{12}$ alkyl methacrylates), such as poly(methyl methacrylate); poly(oxyalkylene) dimethacrylate; poly(alkoxylated phenol methacrylates); cellulose acetate; cellulose triacetate; cellulose acetate propionate; cellulose acetate butyrate; poly(vinyl acetate); poly (vinyl alcohol); poly(vinyl chloride); poly(vinylidene chloride); polyurethanes; polythiourethanes; thermoplastic polycarbonates; polyesters; poly(ethylene terephthalate); polystyrene; poly(α-methylstyrene); copolymers of styrene and methyl methacrylate; copolymers of styrene and acrylonitrile; polyvinylbutyral; and polymers of diallylidene pentaerythritol, particularly copolymers with polyol (allyl carbonate) monomers, e.g., diethylene glycol bis(allyl carbonate), and acrylate monomers, e.g., ethyl acrylate, butyl acrylate. Also contemplated are copolymers of the aforementioned monomers, combinations, and blends of the aforementioned polymers and copolymers with other polymers, e.g., to form interpenetrating network products.

Further, according to various non-limiting embodiments wherein transparency of the photochromic composition is desired, the organic material may be a transparent polymeric material. For example, according to various non-limiting embodiments, the polymeric material may be an optically clear polymeric material prepared from a thermoplastic polycarbonate resin, such as the resin derived from bisphenol A and phosgene, which is sold under the trademark, LEXAN®; a polyester, such as the material sold under the trademark, MYLAR®; a poly(methyl methacrylate), such as the material sold under the trademark, PLEXIGLAS®; and polymerizates of a polyol(allyl carbonate) monomer, especially diethylene glycol bis(allyl carbonate), which monomer is sold under the trademark CR-39®; and polyurea-polyurethane (polyurea urethane) polymers, which are prepared, for example, by the reaction of a polyurethane oligomer and a diamine curing agent, a composition for one such polymer being sold under the trademark TRIVEX® by PPG Industries, Inc. Other non-limiting examples of suitable polymeric materials include polymerizates of copolymers of a polyol (allyl carbonate), e.g., diethylene glycol bis(allyl carbonate), with other copolymerizable monomeric materials, such as, but not limited to: copolymers with vinyl acetate, copolymers with a polyurethane having terminal diacrylate functionality, and copolymers with aliphatic urethanes, the terminal portion of which contain allyl or acrylyl functional groups. Still other suitable polymeric materials include, without limitation, poly(vinyl acetate), polyvinylbutyral, polyurethane, polythiourethanes, polymers chosen from diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers and ethoxylated trimethylol propane triacrylate monomers, cellulose acetate, cellulose propionate, cellulose butyrate, cellulose acetate butyrate, polystyrene and copolymers of styrene with methyl methacrylate, vinyl acetate and acrylonitrile. According to one non-limiting embodiment, the polymeric material may be an optical resins sold by PPG Industries, Inc. under the CR-designation, e.g., CR-307, CR-407, and CR-607.

According to one specific non-limiting embodiment, the organic material may be a polymeric material is chosen from poly(carbonate), copolymers of ethylene and vinyl acetate; copolymers of ethylene and vinyl alcohol; copolymers of ethylene, vinyl acetate, and vinyl alcohol (such as those that result from the partial saponification of copolymers of ethylene and vinyl acetate); cellulose acetate butyrate; poly(urethane); poly(acrylate); poly(methacrylate); epoxies; aminoplast functional polymers; poly(anhydride); poly(urea urethane); N-alkoxymethyl(meth)acrylamide functional polymers; poly(siloxane); poly(silane); and combinations and mixtures thereof.

Further, it will be appreciated by those skilled in the art that the photochromic compositions (including the photochromic coating compositions discussed in more detail below) according to various non-limiting embodiments disclosed herein may further comprise other additives that aid in the processing and/or performance of the composition or a coating or article derived therefrom. Non-limiting examples of such additives include from photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

As previously discussed, the present invention further contemplates photochromic articles, such as optical elements, made using the photochromic materials and/or the photochromic compositions according to various non-limiting embodiments disclosed herein. As used herein, the term "optical" means pertaining to or associated with light and/or vision. The optical elements according to various non-limiting embodiments disclosed herein may include, without limitation, ophthalmic elements, display elements, windows, mirrors, and liquid crystal cell elements. As used herein, the term "ophthalmic" means pertaining to or associated with the eye and vision. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect or enhance (cosmetically or otherwise) vision, including without limitation, magnifying lenses, protective lenses, visors, goggles, as well as, lenses for optical instruments (for example, cameras and telescopes). As used herein, the term "display" means the visible or machine-readable representation of information in words, numbers, symbols, designs or drawings. Non-limiting examples of display elements include screens, monitors, and security elements, such as security marks. As used herein, the term "window" means an aperture adapted to permit the transmission of radiation therethrough. Non-limiting examples of windows include automotive and aircraft transparencies, windshields, filters, shutters, and optical switches. As used herein, the term "mirror" means a surface that specularly reflects a large fraction of incident light. As used herein, the term "liquid crystal cell" refers to a structure containing a liquid crystal material that is capable of being ordered. One non-limiting example of a liquid crystal cell element is a liquid crystal display.

Various non-limiting embodiments disclosed herein provide photochromic articles, such as optical elements, comprising a substrate and a photochromic material according to any of the non-limiting embodiments discussed above connected to a portion of the substrate. As used herein, the term "connected to" means associated with, either directly or indirectly through another material or structure. Further, as used herein in the context of a coating being "on" a surface or object, the term "on" means that the subject coating is connected to the surface or object such that the subject coating is support or carried by the surface or object. For example, a coating that is "on" a surface may be applied directly over the surface or it may be applied over one or more other coatings, at least one of which is applied directly over the surface.

According to various non-limiting embodiments disclosed herein wherein the substrate of the photochromic article comprises a polymeric material, the photochromic material may be connected to at least a portion of the substrate by incorporating the photochromic material into at least a portion of the polymeric material of the substrate, or by incorporating the photochromic material into at least a portion of the oligomeric or monomeric material from which the substrate is formed. For example, according to one non-limiting embodiment, the photochromic article may be formed form a photochromic composition, such as those discussed above, by the cast-in-place method wherein the photochromic material is incorporated into at least a portion of the polymeric material of the substrate by blending and/or bonding the photochromic material with at least a portion of the polymeric material prior to forming the substrate, or by incorporating the photochromic material into at least a portion of the oligomeric or monomeric material from which the polymeric material of the substrate is formed prior to forming the substrate. According to other non-limiting embodiments, the photochromic material may be incorporated into the polymeric material of the substrate imbibition. Imbibition and the cast-in-place method are discussed below in more detail.

According to still other non-limiting embodiments, the photochromic material may be connected to at least a portion of the substrate of the photochromic article as part of at least partial coating that is connected to at least a portion of a substrate. As used herein, the term "coating" means a structure comprising one or more complete or partial layers (which may or may not have a uniform composition and/or cross-sectional thickness) derived from flowable compositions. The flowable compositions from which coatings may be formed include, for example, liquid or powder compositions, which may be applied to the substrate using a methods such as those discussed herein below. According to these non-limiting embodiments, the substrate may be a polymeric substrate or an inorganic substrate (such as, but not limited to, a glass substrate). Examples of monomers and polymers that may be used to form the polymeric substrates according to various non-limiting embodiments disclosed herein include, but are not limited to, those monomers and polymers discussed above that may be useful in forming the photochromic compositions according to various non-limiting embodiments disclosed herein.

According to one non-limiting embodiment disclosed herein, the substrate may be an ophthalmic substrate. As used herein, the term "ophthalmic substrate" refers to lenses, partially formed lenses, and lens blanks. Non-limiting examples of organic materials from which ophthalmic substrates according to various non-limiting embodiments disclosed herein may be formed include, but are not limited to, art-recognized polymers that are useful in forming transparent or optically clear castings for optical applications (such as those previously discussed).

Other non-limiting examples of organic materials suitable for use in forming the substrates according to various non-limiting embodiments disclosed herein include both synthetic and natural organic materials, including without limitation: opaque or translucent polymeric materials, natural and synthetic textiles, and cellulosic materials. Non-limiting examples of inorganic materials suitable for use in forming substrates that may be used in conjunction with various non-limiting embodiments disclosed herein include inorganic oxide-based glasses, minerals, ceramics, and metals. For example, in one non-limiting embodiment the substrate can comprise glass. In other non-limiting embodiments, the substrate may be a ceramic, metal or mineral substrate that has been polished to form a reflective surface. In other non-limiting embodiments, a reflective coating or layer may be deposited or otherwise applied to a surface of an inorganic or an organic substrate to make it reflective or to enhance its reflectivity.

According to various non-limiting embodiments disclosed herein, the substrate may comprise a protective coating on at least a portion of its surface. As used herein, the term "protective coating" refers to coatings or films that can prevent wear or abrasion, provide a transition in properties from one coating or film to another, protect against the effects of polymerization reaction chemicals and/or protect against deterioration due to environmental conditions such as moisture, heat, ultraviolet light, oxygen, etc. For example, commercially available thermoplastic polycarbonate ophthalmic lens substrates are often sold with an abrasion-resistant coating already applied to their surfaces because these surfaces tend to be readily scratched, abraded or scuffed. An example of such one such polycarbonate lens substrate is sold under the trademark GENTEX (by Gentex Optics). Non-limiting examples of abrasion-resistant coatings include, abrasion-resistant comprising silanes, abrasion-resistant coatings comprising radiation-cured acrylate-based thin films, abrasion-resistant coatings based on inorganic materials such as silica, titania and/or zirconia, and combinations thereof. For example, according to various non-limiting embodiments the protective coating may comprise a first coating of a radiation-cured acrylate-based thin film and a second coating comprising a silane. Non-limiting examples of commercial protective coatings products include SILVUE® 124 and HI-GARD® coatings, available from SDC Coatings, Inc. and PPG Industries, Inc., respectively.

According to various non-limiting embodiments disclosed herein, the photochromic material according to various non-limiting embodiments of the present invention discussed above may be incorporated into at least a portion of a coating composition prior to application of the coating composition to the substrate, or alternatively, a coating composition may be applied to the substrate, at least partially set, and thereafter the photochromic material may be imbibed into at least a portion of the coating. As used herein with reference to coatings, coating compositions, or components thereof, the terms "set" and "setting" are intended to include processes, such as, but not limited to, curing, polymerizing, cross-linking, cooling and drying.

Specific non-limiting examples of coating composition into which the photochromic materials according to various non-limiting embodiments disclosed herein may be incorporated include, but are not limited to, those coating compositions known in the art for use in connection with photochromic materials. One non-limiting example of a coating composition into which the photochromic materials according to various non-limiting embodiments disclosed herein may be incorporated is the mono-isocyanate containing coating composition disclosed in U.S. Pat. No. 6,916,537 ("the '537 patent") at col. 3, lines 1 to 12, which comprises (in addition to a photochromic material) a reaction product (non-limiting examples which are set forth in the '537 patent at col. 7, lines 4-37) of a polyol comprising at least one carbonate group (non-limiting examples of which are set forth in the '537 patent at col. 7, line 38 to col. 8, line 49) and an isocyanate comprising at least one reactive isocyanate group and at least one polymerizable double bond (non-limiting examples of which are set forth in the '537 patent at col. 8, line 50 to col. 9, line 44), and which optionally comprises an addition copolymerizable monomer (non-limiting examples of which are set forth in the '537 patent at col. 11, line 47 to col. 20, line 43). The above-referenced disclosure of the '537 patent is hereby specifically incorporated by reference herein.

Another non-limiting example of a coating composition into which the photochromic materials according to various non-limiting embodiments disclosed herein may be incorporated is the poly(urea-urethane) composition disclosed in U.S. Pat. No. 6,531,076, at col. 3, line 4 to col. 10, line 49, which disclosure is hereby specifically incorporated by reference herein. Still another non-limiting example of a coating composition into which the photochromic material according to various non-limiting embodiments disclosed herein may be incorporated is the polyurethane composition disclosed in U.S. Pat. No. 6,187,444, at col. 2, line 52 to col. 12, line 15, which disclosure is hereby specifically incorporated by reference herein.

Yet other non-limiting examples of coating compositions into which the photochromic material according to various non-limiting embodiments disclosed herein may be incorporated include the poly(meth)acrylic coating compositions described in U.S. Pat. No. 6,602,603, at col. 2, line 60 to col. 7, line 50; the aminoplast resin coating compositions described in U.S. Pat. No. 6,506,488, at col. 2, line 43 to col. 12, line 23 & U.S. Pat. No. 6,432,544, at col. 2, line 32 to col. 14, line 5; the polyanhydride coating compositions described in U.S. Pat. No. 6,436,525, at col. 2, line 15 to col. 11, line 60; the epoxy resin coating compositions described in U.S. Pat. No. 6,268,055, at col. 2, line 63 to col. 17, line 3; and the alkoxyacrylamide coating compositions descried in U.S. Pat. No. 6,060,001, at col. 2, line 6 to col. 5, line 39. The above-referenced disclosures are hereby specifically incorporated by reference herein.

Further, it will be appreciated by those skilled in the art that the photochromic coating compositions according to various non-limiting embodiments disclosed herein may further comprise other additives that aid in the processing and/or performance of the composition or coating derived therefrom. Non-limiting examples of such additives include from photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations and mixtures thereof.

According to one non-limiting embodiment, an at least partial coating comprising the photochromic material may be connected to at least a portion of a substrate of a photochromic article, for example, by applying a coating composition comprising the photochromic material to at least a portion of a surface of the substrate, and at least partially setting the coating composition. Additionally or alternatively, the at least partial coating comprising the photochromic material may be connected to the substrate, for example, through one or more additional at least partial coatings. For example, while not limiting herein, according to various non-limiting embodiments, an additional coating composition may be applied to a portion of the surface of the substrate, at least partially set, and thereafter the coating composition comprising the photochromic material may be applied over the additional coating and at least partially set. Non-limiting methods of applying coatings compositions to substrates are discussed herein below.

Non-limiting examples of additional coatings and films that may be used in conjunction with the photochromic articles disclosed herein include primer or compatiblizing coatings; protective coatings, including transitional coatings, abrasion-resistant coatings and other coating that protect against the effects of polymerization reaction chemicals and/or protect against deterioration due to environmental conditions such as moisture, heat, ultraviolet light, oxygen (e.g., UV-shielding coatings and oxygen barrier-coatings); anti-reflective coatings; conventional photochromic coating; polarizing coatings and polarizing stretched-films; and combinations thereof.

Non-limiting examples of primer or compatiblizing coatings that may be used in conjunction with various non-limiting embodiments disclosed herein include coatings comprising coupling agents, at least partial hydrolysates of coupling agents, and mixtures thereof. As used herein "coupling agent" means a material having a group capable of reacting, binding and/or associating with a group on a surface. Coupling agents according to various non-limiting embodiments disclosed herein may include organometallics such as silanes, titanates, zirconates, aluminates, zirconium aluminates, hydrolysates thereof and mixtures thereof. As used herein the phrase "at least partial hydrolysates of coupling agents" means that some to all of the hydrolyzable groups on the coupling agent are hydrolyzed. Other non-limiting examples of primer coatings that are suitable for use in conjunction with the various non-limiting embodiments disclosed herein include those primer coatings described U.S. Pat. No. 6,025,026 at col. 3, line 3 to col. 11, line 40 and U.S. Pat. No. 6,150,430 at col. 2, line 39 to col. 7, line 58, which disclosures are hereby specifically incorporated herein by reference.

As used herein, the term "transitional coating" means a coating that aids in creating a gradient in properties between two coatings. For example, although not limiting herein, a transitional coating may aid in creating a gradient in hardness between a relatively hard coating (such as an abrasion-resistant coating) and a relatively soft coating (such as a photochromic coating). Non-limiting examples of transitional coatings include radiation-cured, acrylate-based thin films as described in U.S. Patent Application Publication No. 2003/0165686 at paragraphs [0079]-[0173], which are hereby specifically incorporated by reference herein.

As used herein the term "abrasion-resistant coating" refers to a protective polymeric material that demonstrates a resistance to abrasion that is greater than a standard reference material, e.g., a polymer made of CR-39® monomer available from PPG Industries, Inc, as tested in a method comparable to ASTM F-735 Standard Test Method for Abrasion Resistance of Transparent Plastics and Coatings Using the Oscillating Sand Method. Non-limiting examples of abrasion-resistant coatings include abrasion-resistant coatings comprising organosilanes, organosiloxanes, abrasion-resistant coatings based on inorganic materials such as silica, titania and/or zirconia, and organic abrasion-resistant coatings of the type that are ultraviolet light curable.

Non-limiting examples of antireflective coatings include a monolayer, multilayer coatings of metal oxides, metal fluorides, or other such materials, which may be deposited onto the articles disclosed herein (or onto self supporting films that are applied to the articles), for example, through vacuum deposition, sputtering, etc.

Non-limiting examples of polarizing coatings and polarizing stretched-films include, but are not limited to, polarizing coatings (such as those described in U.S. Patent Application Publication No. 2005/0151926, at paragraphs [0029]-[0116], which are hereby specifically incorporated by reference herein), and polarizing stretched-films comprising dichroic compounds that are known in the art.

As discussed above, according to various non-limiting embodiments, an additional at least partial coating or film may be formed on the substrate prior to forming the coating comprising the photochromic material according to various non-limiting embodiments disclosed herein on the substrate. For example, according to certain non-limiting embodiments a primer or compatiblizing coating may be formed on the substrate prior to applying the coating composition comprising the photochromic material. Additionally or alternatively, an additional at least partial coating may be formed on the substrate after forming coating comprising the photochromic material according to various non-limiting embodiments disclosed herein on the substrate, for example, as an overcoating on the photochromic coating. For example, according to certain non-limiting embodiments, a transitional coating may be formed over the coating comprising the photochromic material, and an abrasion-resistant coating may be formed over the transitional coating.

For example, according to one non-limiting embodiment there is provided a photochromic article comprising a substrate (such as, but not limited to a plano-concave or a plano-convex ophthalmic lens substrate), which comprises an abrasion-resistant coating on at least a portion of a surface thereof; a primer or compatiblizing coating on at least a portion of the abrasion-resistant coating; a photochromic coating comprising a photochromic material according to various non-limiting embodiments disclosed herein on at least a portion of the primer or compatiblizing coating; a transitional coating on at least a portion of the photochromic coating; and an abrasion-resistant coating on at least a portion of the transitional coating. Further, according to this non-limiting embodiment, the photochromic article may also comprise, for example, an antireflective coating that is connected to a surface of the substrate and/or a polarizing coating or film that is connected to a surface of the substrate.

One non-limiting embodiment of the present invention provides a method of making a photochromic composition, the method comprising incorporating a photochromic material according to any of the various non-limiting embodiments of the present invention into at least a portion of an organic material. Non-limiting methods of incorporating photochromic materials into an organic material include, for example, mixing the photochromic material into a solution or melt of a polymeric or oligomeric material, and subsequently at least partially setting the polymeric or oligomeric material (with or without bonding the photochromic material to the organic material); mixing the photochromic material with a monomeric material and subsequently at least partially polymerizing the monomer (with or without co-polymerizing the photochromic material with the monomer or otherwise bonding the photochromic material to the resultant polymer or intermediate in the polymerization reaction as previously discussed); and imbibing the photochromic material into a polymeric material (with or without bonding the photochromic material to the polymeric material).

Another non-limiting embodiment provides a method of making a photochromic article comprising connecting a photochromic material according to any of the various non-limiting embodiments discussed above, to at least a portion a substrate. For example, if the substrate is formed from a polymeric material, the photochromic material may be connected to at least a portion of the substrate by the cast-in-place method and/or by imbibition. For example, in the cast-in-place method, the photochromic material may be mixed with a polymeric solution or melt, or other oligomeric and/or monomeric solution or mixture, which is subsequently cast into a mold having a desired shape and at least partially set to form the substrate. Optionally, according to this non-limiting embodiment, the photochromic material may be bonded to a portion of the polymeric material of the substrate, for example, by co-polymerization with a monomeric precursor thereof or an intermediate in the polymerization reaction. In the imbibition method, the photochromic material may be diffused into the polymeric material of the substrate after it is formed, for example, by immersing a substrate in a solution containing the photochromic material, with or without heating. Thereafter, although not required, the photochromic material may be bonded with the polymeric material.

Other non-limiting embodiments disclosed herein provide a method of making an photochromic article comprising connecting a photochromic material to at least a portion of a substrate by at least one of in-mold casting, coating and lamination.

For example, according to one non-limiting embodiment, wherein the substrate comprises a polymeric material, the photochromic material may be connected to at least a portion of a substrate by in-mold casting. According to this non-limiting embodiment, a coating composition comprising the photochromic material, which may be a liquid coating composition or a powder coating composition, may be applied to the surface of a mold and at least partially set. Thereafter, a polymer solution or melt, or oligomeric or monomeric solution or mixture is cast over the coating and at least partially set. After setting, the coated substrate is removed from the mold. Non-limiting examples of powder coatings in which the photochromic materials according to various non-limiting embodiments disclosed herein may be employed are set forth in U.S. Pat. No. 6,068,797 at col. 7, line 50 to col. 19, line 42, which disclosure is hereby specifically incorporated by reference herein.

According to still another non-limiting embodiment, wherein the substrate comprises a polymeric material or an inorganic material such as glass, the photochromic material may be connected to at least a portion of a substrate by a coating process. Non-limiting examples of suitable coating processes include spin coating, spray coating (e.g., using a liquid or a powder coating compositions), curtain coating, roll coating, spin and spray coating, over-molding, and combinations thereof. For example, according to one non-limiting embodiment, the photochromic material may be connected to the substrate by over-molding. According to this non-limiting embodiment, a coating composition comprising the photochromic material (examples of which coatings are discussed above) may be applied to a mold and then a substrate may be placed into the mold such that the substrate contacts the coating causing it to spread over at least a portion of the surface of the substrate. Thereafter, the coating composition may be at least partially set and the coated substrate may be removed from the mold. Alternatively, the over-molding process may comprise placing the substrate into a mold such that an open region is defined between the substrate and the mold, and thereafter injecting a coating composition comprising the photochromic material into the open region. Thereafter, the coating composition may be at least partially set and the coated substrate may be removed from the mold. According to another non-limiting embodiment, the photochromic material may be connected to substrate by spin-coating a coating composition comprising the photochromic material onto the substrate, for example, by rotating the substrate and applying the coating composition to the substrate while it is rotating and/or by applying the coating composition to the substrate and subsequently rotating it.

Additionally or alternatively, a coating composition (with or without a photochromic material) may be applied to a substrate (for example, by any of the foregoing coating processes), the coating composition may be at least partially set, and thereafter, a photochromic material according to any of the various non-limiting embodiments disclosed herein may be imbibed (as previously discussed) into the coating.

As discussed above, according to various non-limiting embodiments disclosed herein, after forming the photochromic coating, at least a portion of the photochromic coating may be at least partially set. For example, according to various non-limiting embodiments disclosed herein, at least partially setting at least a portion of the photochromic coating may comprise exposing the photochromic coating to at least one of actinic radiation and thermal radiation to at least partially dry, polymerize and/or cross-link one or more components of the coating composition.

According to yet another non-limiting embodiment, wherein the substrate comprises a polymeric material or an inorganic material such as glass, the photochromic material may be connected to at least a portion of a substrate by lamination. For example, according to this non-limiting embodiment, a self-supporting film or sheet comprising the photochromic material may be adhered or otherwise connect to a portion of the substrate, with or without an adhesive and/or the application of heat and pressure. Optionally, thereafter a protective coating may be applied over the film; or a second substrate may be applied over the first substrate and the two substrates may be laminated together (i.e., by the application of heat and pressure) to form an element wherein the film comprising the photochromic material is interposed between the two substrates. Methods of forming films comprising a photochromic material may include for example and without limitation, combining a photochromic material with a polymeric solution or oligomeric solution or mixture, casting or extruding a film therefrom, and, if required, at least partially setting the film. Additionally or alternatively, a film may be formed (with or without a photochromic material) and imbibed with the photochromic material (as discussed above).

Further, according to various non-limiting embodiments, prior to connecting the photochromic material to at least a portion of the substrate by any of coating and lamination, a primer or compatiblizing coating (such as those discussed above) may be formed on at least a portion of the surface of the substrate to enhance one or more of the wetting, adhesion, and/or chemical compatibility of the photochromic coating with the substrate. Non-limiting examples of suitable primer or compatiblizing coatings and methods of making the same are disclosed above. Still further, as previously discussed according to various non-limiting embodiments disclosed herein, the substrate may comprise an abrasion-resistant coating on at least a portion of its surface.

According to various non-limiting embodiments disclosed herein, prior to applying any coating or film to the substrate, for example, prior to connecting the photochromic material to at least a portion of the surface of the substrate by coating and/or lamination or prior to applying a primer or compatiblizing coating to the substrate, the surface may be cleaned and/or treated to provide a clean surface and/or a surface that may enhance adhesion of the photochromic coating to the substrate. Effective cleaning and treatments commonly used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge, and chemical treatment that results in hydroxylation of the substrate surface, e.g., etching of the surface with an aqueous solution of alkali metal hydroxide, e.g., sodium or potassium hydroxide, which solution can also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials. The foregoing disclosures are specifically incorporated herein by reference.

In one non-limiting embodiment, surface treatment of the substrate is a low temperature plasma treatment. Although not limiting herein, this method allows treatment of the surface to enhance adhesion of a coating formed thereon, and can be a clean and efficient way to alter the physical surface, e.g., by roughening and/or chemically altering the surface without affecting the rest of the article. Inert gases, such as argon, and reactive gases, such as oxygen, have been used as the plasma gas. Inert gases may roughen the surface, while reactive gases such as oxygen may both roughen and chemically alter the surface exposed to the plasma, e.g., by producing hydroxyl or carboxyl units on the surface. According to one non-limiting embodiment, oxygen may be used as the plasma gas. Although not limiting herein, it is considered that oxygen may provides a slight, but effective, physical roughening of the surface along with a slight, but effective, chemical modification of the surface. As will be appreciated by those skilled in the art, the extent of the surface roughening and/or chemical modification will be a function of the plasma gas and the operating conditions of the plasma unit (including the length of time of the treatment).

The surface of the substrate subjected to plasma treatment may be at room temperature or may be preheated slightly prior to or during plasma treatment. Although not limiting herein, according to various non-limiting embodiments, the temperature of the surface to be subjected to a plasma treatment may be maintained at a temperature below a temperature at which the surface may be adversely affected (other than the intended increase in surface area by roughening and slight chemical modification) by the plasma. One skilled in the art can readily select the operating conditions of the plasma unit, vis-à-vis, the plastic substrate treated, to achieve an improvement in the adhesion of a superimposed film/coating on the plasma treated surface.

Various non-limiting embodiments disclosed herein further contemplate the use of various combinations of the foregoing methods to form photochromic articles according to various non-limiting embodiments disclosed herein. For example, and without limitation herein, according to one non-limiting embodiment, a photochromic material may be connected to substrate by incorporation into an organic material from which the substrate is formed (for example, using the cast-in-place method and/or imbibition), and thereafter a photochromic material (which may be the same or different from the aforementioned photochromic material) may be connected to a portion of the substrate using the in-mold casting, coating and/or lamination methods discussed above.

According to various non-limiting embodiments, the photochromic materials described herein may be used in amounts (or ratios) such that the organic material or substrate into which the photochromic materials are incorporated or otherwise connected exhibits desired optical properties. For example, the amount and types of photochromic materials may be selected such that the organic material or substrate may be clear or colorless when the photochromic material is in the ground-state form and may exhibit a desired resultant color when the photochromic material is in the activated-state form. The precise amount of the photochromic material to be utilized in the various photochromic compositions, photochromic coatings and coating compositions, and photochromic articles described herein is not critical provided that a sufficient amount is used to produce the desired effect. It should be appreciated that the particular amount of the photochromic material used may depend on a variety of factors, such as but not limited to, the absorption characteristics of the photochromic material, the color and intensity of the color desired upon activation, and the method used to incorporate or connect the photochromic material to the substrate. Although not limiting herein, according to various non-limiting embodiments disclosed herein, the amount of the photochromic material that is incorporated into an organic material may range from 0.01 to 40 weight percent based on the weight of the organic material.

Various non-limiting embodiments of the present invention will be better understood when read in conjunction with the following non-limiting examples.

EXAMPLES

Part 1—Preparation of Photochromic Materials

One non-limiting example of a photochromic indeno-fused naphthopyran that may be used in certain non-limiting embodiments of the present disclosure includes 3,3-di(4-methoxyphenyl)-6,11,13-trimethyl-13-(2-(2-(2-hydroxyethoxy)ethoxy)ethoxy)-3H,13H-indeno[2,1-f]naphtho[1,2-b]pyran (hereinafter designated as PM-1) which is represented by the following graphic formula:

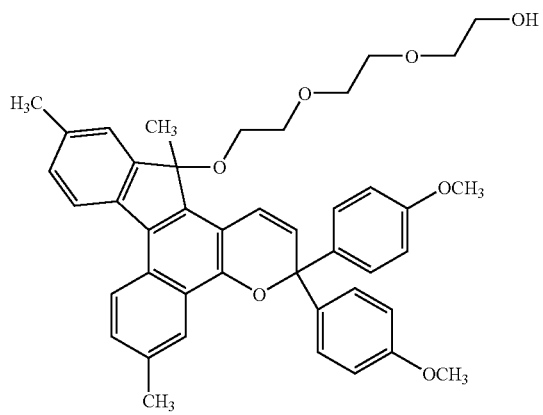

PM-1 was prepared as follows. The product of Example 5 in U.S. Pat. No. 5,645,767 (which example is hereby specifically incorporated by reference) (3,3-di(4-methoxyphenyl)-6,11,13-trimethyl-13-hydroxy-3H,13H-indeno[2,1-f]naphtho[1,2-b]pyran, 200 grams) was added to a reaction flask containing 700 mL triethylene glycol and 750 mL of acetonitrile. The resulting mixture was stirred under a nitrogen atmosphere and heated to 80° C. Subsequently, 2 grams of p-toluene sulfonic acid was added to the reaction mixture. After 30 minutes at 80° C., the reaction was quenched into 8 L of water with vigorous stirring until a green solid precipitated out. The solid was filtered, washed with water, dried in air, and purified by column chromatography. Subsequent crystallization from diethyl ether yielded 152 grams of white solid. NMR analysis showed the product to have a structure consistent with 3,3-di(4-methoxyphenyl)-6,11,13-trimethyl-13-(2-(2-(2-hydroxyethoxy)ethoxy)ethoxy)-3H,13H-indeno[2,1-f]naphtho[1,2-b]pyran.

Part 2—Preparation of Polyester Polyols

Composition A

The polyester polyols of the Examples were prepared using Compositions A-D as described herein. Preparation of Compositions A-D are described as follows.

The ingredients used to prepare Composition A are listed in Table 1.

TABLE 1

| Ingredients for Composition A | |
|---|---|
| Ingredients | Weight (grams) |
| Charge 1 | |
| Trimethylol propane | 151.1 |
| 1,4-Cyclohexane Dicarboxylic Acid | 96.9 |
| Isostearic Acid | 160.0 |
| Xylene | 30.0 |
| Triphenyl phosphite | 1.01 |
| Dibutyltin Oxide | 0.49 |
| Charge 2 | |
| M-Pyrol | 269.5 |
| Charge 3 | |
| HDI[(1)] | 70.6 |
| Charge 4 | |
| M-Pyrol | 49.5 |

[(1)]HDI is 1,6-diisocyanatohexane available from Aldrich of Milwaukee, Wisconsin.

The ingredients of Charge 1 were added in the order listed in Table 1 to a five-liter, four-necked round bottom flask equipped with a motor driven stainless steel paddle agitator, a thermocouple to record batch temperature, a Dean-Stark water trap connected with a condenser to collect distillate evolved, and a nitrogen sparge tube. The contents of the reaction flask were heated to 200° C. with stirring, a nitrogen blanket was applied, and the column was packed. Water was removed by azeotropic separation. The temperature was held at 200° C. for approximately five hours until an acid value of less than four, as measured by potentiometric titration with KOH, was obtained. A nitrogen sparge was also applied for about the last four hours. The heat was removed, the nitrogen turned off, and the contents of the flask were cooled to 80° C. Charge 2 was added with stirring. Charge 3 was added over a thirty minute period followed by Charge 4. The resulting mixture was kept at 80° C. and after one hour the measurable amount of free isocyanate was determined to be zero or close to zero in a sample of the reaction mixture streaked onto a salt slide and tested by infrared analysis at 2260 cm$^{-1}$. The calculated Hydroxyl Number was 59.8 milligrams potassium hydroxide per gram.

Composition B

For the preparation of Composition B, the procedure and ingredients of Composition A was followed except that 1,10-Dodecane Dicarboxylic acid (130.0 g) was used in place of 1,4-Cyclohexane Dicarboxylic Acid (96.9 g). The calculated Hydroxyl Number was 59.6 milligrams potassium hydroxide per gram.

Part 3—Preparation of Isocyanate Functional Photochromic Compositions

Composition C

Composition C was prepared by reacting Charge A and Charge B as described herein. The ingredients of Charge A and Charge B are listed in Table 2. Charge A was prepared as follows. The ingredients of Charge A were added to a 100 mL flask. Heat was applied until the temperature was raised to reflux at 120° C. and maintained at this temperature for 2 hours. The reaction mixture was cooled to room temperature and 3 drops (approximately 0.06 g) of dibutyltin dilaurate were added.

TABLE 2

Ingredients for Composition C

| Ingredients | Weight (grams) |
| --- | --- |
| Charge A | |
| PM-1$^{(2)}$ | 26.9 |
| NMP$^{(3)}$ | 26.9 |
| Toluene | 12.0 |
| Charge B | |
| DDI$^{(4)}$ | 23.5 |
| NMP$^{(3)}$ | 23.5 |
| Toluene | 15.0 |

$^{(2)}$PM-1 is 3,3-di(4-methoxyphenyl)-6,11,13-trimethyl-13-(2-(2-(2-hydroxyethoxy)ethoxy)ethoxy)-3H,13H-indeno[2,1-f]naphtho[1,2-b]pyran (see PART 1).
$^{(3)}$NMP is N-methylpyrrolidinone (biotechnical grade) available from Aldrich of Milwaukee, Wisconsin.
$^{(4)}$DDI is reported to be 2-heptyl-3,4-bis(9-isocyanatononyl)-1-pentyl-cyclohexane available from Cognis Corporation, Cincinnati, Ohio.

The ingredients of Charge B were added to a 250 mL flask. Heat was applied until the temperature was raised to reflux at 126° C. and heating was continued until the temperature increased to 136° C. after one hour. The temperature of the flask contents was cooled to 90° C. Charge A was added to the flask over a period of one hour while the temperature was maintained at 90° C. The resulting reaction mixture was maintained at this temperature for 2 hours and subsequently cooled to room temperature to give Composition C. Analysis of the Composition C revealed that the amount of free isocyanate was 1.32 weight percent.

Composition D

Composition D was prepared using Charge A, as set forth in Composition C, and Charge C, as set forth in Table 3. The ingredients of Charge A were added to a 100 mL flask and mixed by stirring. The ingredients of Charge C were added to a 250 mL flask. Heat was applied until the temperature was raised to 90° C. Three drops (approximately 0.06 g) of dibutyltin dilaurate was added. Charge A was added to the flask containing Charge C over a period of one hour while the temperature was maintained at 90° C. The resulting reaction mixture was maintained at this temperature for 1 hour and subsequently cooled to room temperature. Analysis of the final product revealed that the amount of free isocyanate was 1.49 weight percent.

TABLE 3

Ingredients of Charge C

| Ingredients Charge C | Weight (grams) |
| --- | --- |
| DDI$^{(4)}$ | 23.5 |
| NMP$^{(3)}$ | 23.5 |

Part 4—Preparation Of Examples

Example 1

A polyester polymer was prepared using Compositions A and C as described above. The ingredients of Charge 1, used to prepare the polyester polymer Example 1, are listed in Table 4.

TABLE 4

Ingredients for Example 1

| Ingredients Charge 1 | Weight (grams) |
| --- | --- |
| Composition A | 100.0 |
| Composition C | 14.4 |
| Dibutyltin dilaurate | 0.06 |

The ingredients of Charge 1 were added in the order listed to a three neck round bottom flask equipped with a mechanical stirrer, heating mantle, condenser, and nitrogen sparge. The contents of the reaction flask were stirred and heated to 80° C., a nitrogen blanket was applied, and the temperature was maintained at 80° C. for one hour. The reaction mixture was held under these conditions an additional 30 minutes until all of the free isocyanate was zero or close to zero as determined by infrared analysis as described in the preparation of Composition A. The calculated Hydroxyl Number of the resulting polyester polyol was 49.5 milligrams potassium hydroxide per gram.

Example 2

The procedure of Example 1 was followed except that 50.23 g of Composition A was used instead of 100.0 g of Composition A and Composition D (11.84 g) was used instead of Composition C (14.4 g). The calculated Hydroxyl Number of the resulting polyester polyol was 44.6 milligrams potassium hydroxide per gram.

Example 3

The procedure of Example 1 was followed except that Composition B (50.03 g) was used in place of Composition A (100.0 g) and Composition D (7.82 g) was used instead of Composition C (14.4 g) and N-methylpyrrolidinone (17.5 g) was added. The calculated Hydroxyl Number of the resulting polyester polyol was 37.5 milligrams potassium hydroxide per gram.

Part 5—Preparation of Coating Compositions and Coated Lenses

Each coating composition was prepared by pre-dissolving the appropriate photochromic material in N-methylpyrrolidinone (NMP) and subsequently adding the remaining components set forth in Table 5 in the listed amounts to this solution. The resultant mixture was stirred using a magnetic stir bar for approximately 30 minutes until a homogeneous mixture was obtained. After mixing, each coating composition, except Example 1, was applied to a pair of Gentex PDQ hardcoated polycarbonate lens (1.5 mm×70 mm), which had been previously plasma treated, by spin coatings at 1500 rpm for 6 seconds to a wet weight of approximately 0.2 g. The coatings were cured at 120° C. for 1 hour to a final thickness of approximately 20 microns.

TABLE 5

Coating Compositions

| Material (grams) | Coating Example 1 | Coating Example 2 | Coating Example 3 |
|---|---|---|---|
| HDIB[14] | 1.16 | 1.28 | 0.95 |
| NMP[4] | 0.60 | 0.82 | 0.14 |
| A-187[5] | 0.10 | 0.11 | 0.07 |
| DBTDL | 0.04 | 0.045 | 0.03 |
| BYK ® 333[6] | 0.01 | 0.015 | 0.01 |
| T-144[7] | 0.05 | 0.036 | 0.02 |
| PC-1122[8] | 0.15 | 0.50 | — |
| PP[9] | — | — | 0.20 |
| EX. 1 | 1.71 | — | — |
| EX. 2 | — | 1.57 | — |
| EX. 3 | — | — | 1.50 |

[14]HDI Biuret BI7960 is reported to be a blocked hexamethylene diisocyanate available from Baxenden Chemical Co. of Lancashire, England.
[5]SILQUEST ® A-187 is A gamma-glycidoxypropyl trimethoxysilane, which is available from Osi Specities of Paris, France.
[6]BYK ® 333 is a polyether modified dimethylpolysiloxane compolymer, which is available from BYK-Chemie of Wallingford, Connecticut.
[7]TINUVIN ®-144 is an light stabilizer of the hindered amine class reported to have CAS# 63843-89-0 and is available from Ciba Specialty Chemicals.
[8]PC-1122 is aliphatic carbonate diol, which is available form Stahl USA.
[9]A poly(meth)acrylic polyol produced by following the procedure of Composition D of Example 1 in U.S. Pat. No. 6,187,444, which procedure is incorporated herein by reference, except that in Charge 2, the styrene was replaced with methyl methacrylate and 0.5% by weight, based on the total monomer weight, of triphenyl phosphite was added.

The coating composition of Example 1 was applied to two pair of the aforedescribed lenses and after curing, one pair of the coated lenses were further coated with an abrasion-resistant coating and were identified as Example 1A. An organo silane-based abrasion-resistant coating was applied by spin-coating to the surface of the cured photochromic coating on the lenses of Example 1A. The lenses were then heated beneath a Sun-Mite Infrared Heater Model FFH-912A at a distance of about 30.48 cm (12 inches) for about 5 minutes. The thicknesses of the abrasion-resistant coatings were approximately 2 microns. The other pair was identified as Example 1B and was further plasma treated and a protective coating having the composition set forth below in Table 6 was spun over the photochromic coating to a wet film weight of approximately 0.6 grams and cured by UV in a nitrogen atmosphere to a thickness of approximately 10-12 microns. Each of the protective coated lenses was then subjected to a post-bake of 105° C. for 3 hours.

TABLE 6

Composition of Protective Coating

| Component | Amount in Weight Percent |
|---|---|
| SR-399[10] | 5 |
| SR-350[11] | 30 |
| SR-348[12] | 35 |
| Partially methacrylated bisphenol A diepoxide[13] | 30 |
| SILQUEST ® A-187[5] | 20 |
| Irgacure 819[14] | 0.1 |
| CD-1011[16] | 4 |

[10]SR-399 is a dipentaerythritol pentaacrylate, which is available from Sartomer Company of Exton, Pennsylvania.
[11]SR-305 is a trimethylolpropane trimethacrylate, which is available from Sartomer Company.
[12]SR-348 is an ethoxylated bisphenol A dimethacrylate, which is available from Sartomer Company.
[13]Obtained from Echo Resins and Laboratories, of Versailles, Missouri as ADME#302.
[14]IRGACURE ® 819 is a bisacrylphosphine oxide photoinitiator, which is available from Ciba-Geigy of Basel, Switzerland.
[15]CD-1011 is a triarylsulfonium hexafluorophosphate cationic photoinitiator, which is available from Sartomer Company.

Part 6—Photochromic Performance and Fischer Microhardness Testing of the Coated Lenses The photochromic performance of each of the aforementioned coated lenses was determined as follows. The coated lenses prepared in Part 5 were tested for photochromic response on the Bench for Measuring Photochromics ("BMP") optical bench made by Essilor, Ltd. France. The optical bench was maintained at a constant temperature of 23° C. (73.4° F.) during testing.

Prior to testing on the optical bench, each of the coated lenses were exposed to 365-nanometer ultraviolet light for about 10 minutes at a distance of about 14 centimeters to activate the photochromic materials. The UVA (315 to 380 nm) irradiance at the lens was measured with a Licor Model Li-1800 spectroradiometer and found to be 22.2 watts per square meter. The lens was then placed under a 500 watt, high intensity halogen lamp for about 10 minutes at a distance of about 36 centimeters to bleach (inactivate) the photochromic materials. The illuminance at the lens was measured with the Licor spectroradiometer and found to be 21.4 Klux. The lenses were then kept in a dark environment at room temperature (from 21° C. to 24° C., or 70° F. to 75° F.) for at least 1 hour prior to testing on an optical bench. Prior to optical bench measurement, the lenses were measured for ultraviolet absorbance at 390 and 405 nm.

The BMP optical bench was fitted with two 150-watt ORIEL® Model #66057 Xenon arc lamps at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 5.1 cm×5.1 cm (2 inch×2 inch) 50% polka dot beam splitter, at 45° to each lamp is used to mix the two beams. The combination of neutral density filters and voltage control of the Xenon arc lamp were used to adjust the intensity of the irradiance. Proprietary software was used on the BMP to control timing, irradiance, air cell and sample temperature, shuttering, filter selection and response measurement. A ZEISS® spectrophotometer, Model MCS 501, with fiber optic cables for light delivery through the lens was used for response and color measurement. Photopic response measurements, as well as the response at four select wavelengths, were collected on each lens.

The power output of the optical bench, i.e., the dosage of light that the lens was exposed to, was adjusted to 6.7 Watts per square meter (W/m²) UVA, integrated from 315-380 nm and 50 Klux illuminance, integrated from 380-780 nm. Measurement of the power output was made using the optometer and software contained within the BMP.

Response measurements, in terms of a change in optical density (ΔOD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $\Delta OD = \log_{10}(\% Tb/\% Ta)$, where % Tb is the percent transmittance in the bleached state, % Ta is the percent transmittance in the activated state. Optical density measurements were based on photopic optical density.

The results of this testing are presented below in Table 7, wherein the First Fade Half Life ("T½") value is the time interval in seconds for the ΔOD of the activated form of the photochromic material in the coating to reach one half the fifteen-minute ΔOD at 23° C. (73.4° F.), after removal of the activating light source. The Second Fade Half Life ("2T½") value is the time interval in seconds for the ΔOD of the activated form of the photochromic material in the coating to reach one quarter the fifteen-minute ΔOD at 23° C. (73.4° F.), after removal of the activating light source. The Third Half Life ("3T½") value is the time interval in second for ΔOD of the activated form of the photochromic material in the coating to reach one-eighth the fifteen-minute ΔOD at 23° C. (73.4° F.), after removal of the activating light source.

The Fischer Microhardness test results reported in Table 7 were determined using a FISCHERSCOPE® HCV, Model H-100 available from Fischer Technology, Inc. The Fischer microhardness (or "Fischer Hardness"), measured in Newtons per mm², of the coatings was determined under the conditions of a 100 milliNewton load, 30 load steps, and 0.5 second pauses between load steps. The Fischer Hardness data reported herein were measured at an indentor depth of 2 μm.

TABLE 7

| | Photoptic Results | | | |
|---|---|---|---|---|
| Parameter | Coating Example 1A | Coating Example 1B | Coating Example 2 | Coating Example 3 |
| ΔOD | 0.675 | 0.617 | 0.705 | 0.700 |
| T½ (seconds) | 71 | 70 | 47 | 85 |
| 2nd T½ (seconds) | 176 | 175 | 114 | 218 |
| 3rd T½ (seconds) | 455 | 466 | — | — |
| Fischer microhardness (N/mm²) | 14 | — | 3 | 14 |

The results of Table 7 showing comparable data for Examples 1A having a hardcoat, and Example 1B having a thicker protective coating indicate that the photochromic material did not migrate out of the photochromic coating and into the thicker protective coating of Example 1B. The results for Example 2 demonstrated a shorter T½ and a lower Fischer microhardness than Examples 1A and 1B while the results for Example 3 showed a longer T½ and an equivalent Fischer microhardness than Examples 1A and 1B.

As previously discussed, while the present invention is described herein connection with certain embodiments and examples, the present invention is not limited to the particular embodiments and examples disclosed, but is intended to cover modifications that are within the spirit and scope of the invention, as defined by the appended claims. Further, it is to be understood that the present description illustrates aspects of the invention relevant to a clear understanding of the invention. Accordingly, certain aspects of the invention that would be apparent to those of ordinary skill in the art and that, therefore, would not facilitate a better understanding of the invention have not been presented in order to simplify the present description.

What is claimed is:

1. A photochromic polyester comprising a reaction product of:
   (a) a hyperbranched polyester polyol comprising, on average, more than two hydroxyl groups; and
   (b) a photochromic group comprising a group that is adapted to react with a hydroxyl group of the hyperbranched polyester polyol, said group that is adapted to react with a hydroxyl group of the hyperbranched polyester polyol being at least one of isocyanate (—NCO), carboxylic acid (—C(=O)OH), alkyl ester (—C(=O)R), amide (—C(=O)NR₂), anhydride (—C(=O)OC(=O)R), chloroformate (—OC(=O)Cl) or epoxy
   wherein the photochromic group is selected from the group consisting of benzopyrans, naphtho[1,2-b]pyrans, naphtho[2,1-b]pyrans, indeno-fused naphthopyrans, heterocyclic-fused naphthopyrans, spiro-9-fluoreno[1,2-b]pyrans, phenanthropyrans, quinopyrans, fluoroanthenopyrans, spiropyrans, benzoxazines, naphthoxazines, spiro-oxazines, fulgides, and fulgimides.

2. The photochromic polyester of claim 1, wherein the photochromic group comprising a group adapted to react with a hydroxyl group of the hyperbranched polyester polyol is an indeno-fused naphthopyran comprising a group adapted to react with a hydroxyl group of the hyperbranched polyester polyol.

3. The photochromic polyester of claim 1, wherein the hyperbranched polyester polyol comprises a reaction product of:
   (a) a branched polyol comprising, on average, more than two hydroxyl groups;
   (b) an aliphatic monocarboxylic acid comprising a chain of at least 10 carbon atoms; and
   (c) a dicarboxylic acid or a lactone, wherein the lactone may be a cyclic ester having from 3 to 10 ring carbons and wherein dicarboxylic acid may be at least one of:
      (i) an aliphatic dicarboxylic acid comprising represented by HOOC—(CH₂)ₘ—COOH, wherein m is an integer ranging from 8 to 32,
      (ii) an alicyclic dicarboxylic acid comprising from 4 to 20 carbon atoms in the alicyclic ring, or
      (iii) an aromatic dicarboxylic acid comprising an from 6 to 10 carbon atoms in the aromatic ring.

4. The photochromic polyester of claim 3, wherein the branched polyol comprising, on average, more than two hydroxyl groups is one of trimethylolpropane, di-trimethylolpropane, glycerol, pentaerythritol, 1,3,4-butanetriol, 1,2,6-hexanetriol, 1,2,9-nonanetriol, trimethanolethane, sugar alcohols, such as sorbitol and mannitol, other polyhydroxymethyl ($C_2$-$C_{10}$)alkanes, or mixtures thereof.

5. The photochromic polyester of claim 3, wherein the aliphatic monocarboxylic acid comprising a chain of at least 10 carbon atoms is one of decanoic acid (capric acid); dodecanoic acid (lauric acid); tetradecanoic acid (myristic acid); hexadecanoic acid (palmitic acid); 9-hexadecenoic acid (palmitoleic acid); octadecanoic acid (stearic acid); isooctadecanoic acid (isostearic acid); 9-octadecenoic acid (oleic acid); 11-octadecenoic acid (vaccenic acid); 9,12-octadecandienoic acid (linoleic acid); 9,12,15-octadecatrienoic acid (α-linolenic acid); 6,9,12-octadecatrienoic acid (γ-linolenic acid); eicosanoic acid (arachidic acid); 9-eicosenoic acid (gadoleic acid); 5,8,11,14-eicosatetraenoic acid (arachidonic acid); 5,8,11,14,17-eicosapentaenoic acid; docosanoic acid (behenic acid); 12-docosenoic acid (erucic acid); 4,7,10,13, 16, 19-docosahexaenoic acid; tetracosanoic acid (lignoceric acid); isomers thereof or mixtures thereof.

6. The photochromic polyester of claim 3, wherein the dicarboxylic acid is one of 1,8-octanedioic acid (suberic acid); 1,9-nonanedioic acid (azelaic acid); 1,10-decanedioic acid (sebacic acid); 1,12-dodecanedioic acid; 1,13-tridecanedioic acid brassylic acid); 1,14-tetradecanedioic acid; 1,15-pentadecanedioic acid ; 1,16-hexadecanedioic acid (thapsic acid); 1,18-octadecanedioic acid; 1,4-cyclohexanedioic acid; isomers thereof or mixtures thereof.

7. The photochromic polyester of claim 1, wherein the hyperbranched polyester polyol comprises a reaction product of:
(a) a branched polyol comprising, on average, more than two hydroxyl groups;
(b) an aliphatic monocarboxylic acid comprising a chain of at least 10 carbon atoms;
(c) a dicarboxylic acid or a lactone, wherein the lactone comprises a cyclic ester having from 3 to 10 ring carbons and wherein dicarboxylic acid comprises at least one of:
  (i) an aliphatic dicarboxylic acid represented by HOOC—$(CH_2)_m$—COOH, wherein m is an integer ranging from 8 to 32,
  (ii) an alicyclic dicarboxylic acid comprising from 4 to 20 carbon atoms in the alicyclic ring, or
  (iii) an aromatic dicarboxylic acid comprising from 6 to 10 carbon atoms in the aromatic ring; and
(d) an aliphatic diisocyanate represented by OCN—$(CR_2)_n$—NCO, wherein n is an integer ranging from 3 to 40 and each R is, independently, H or $C_1$-$C_4$ alkyl.

8. The photochromic polyester of claim 1, wherein the photochromic compound comprising the group that is adapted to react with a hydroxyl group of the hyperbranched polyester polyol is represented by:

wherein:
(a) PC is an indeno-fused naphthopyran;
(b) n' is an integer ranging form 1 to 8; and
(c) each S' independently is a group represented by:

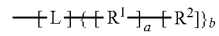

wherein
(i) each L is independently a linking group that forms at least one covalent bond with a group $R^1$ or a group $R^2$ and at least one covalent bond with PC, the linking group being —O—, —N—, or —S—; or L comprises a linear or branched organic bridging group comprising a linking group that forms at least one covalent bond with a group $R^1$ or a group $R^2$, the linking group being —O—, —N—, or —S—;
(ii) each a is independently an integer ranging from 0 to 500;
(iii) each $R^1$ is independently a ring-opened cyclic monomer;
(iv) each $R^2$ is independently a residue of one of a diisocyanate, wherein the residue comprises an isocyanate (—NCO) group that is adapted to react with a hydroxyl group of the hyperbranched polyester polyol; a residue of a dicarboxylic acid, wherein the residue comprises a carboxy (—C(=O)OH) group that is adapted to react with a hydroxyl group of the hyperbranched polyester polyol; a residue of a diester, wherein the residue comprises an alkyl ester (—C(=O)OR) group that is adapted to react with a hydroxyl group of the hyperbranched polyester polyol; a residue of a diamide, wherein the residue comprises an amide (—C(=O)$NR_2$) group that is adapted to react with a hydroxyl group of the hyperbranched polyester polyol; a residue of a dianhydride, wherein the residue comprises an anhydride (—C(=O)OC(=O)R) group that is adapted to react with a hydroxyl group of the hyperbranched polyester polyol; a residue of a bis-epoxide, wherein the residue comprises an epoxy group that is adapted to react with a hydroxyl group of the hyperbranched polyester polyol; or a residue of a bischloroformate, wherein the residue comprises an chloroformate (—OC(=O)Cl) group that is adapted to react with a hydroxyl group of the hyperbranched polyester polyol; and
(v) b is an integer ranging from 1 to 20.

9. The photochromic polyester of claim 8, wherein $R^2$ is a residue of an aliphatic diisocyanate, the aliphatic diisocyanate being represented by OCN—$(CR_2)_n$—NCO, wherein n is an integer ranging from 3 to 40 and wherein each R may independently be hydrogen or $C_1$-$C_6$ alkyl.

10. The photochromic polyester of claim 8, wherein the indeno-fused naphthopyran comprising the group that is adapted to react with a hydroxyl group of the hyperbranched polyester polyol is represented by:

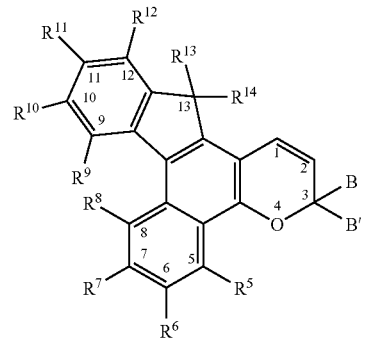

wherein
B and B' are each independently:
(a) a metallocenyl group;
(b) an aryl group that is mono-substituted with a reactive substituent, a compatiblizing substituent or the group S';
(c) 9-julolidinyl, an unsubstituted, mono-, di- or trisubstituted aryl group chosen from phenyl and naphthyl, an unsubstituted, mono- or di-substituted heteroaromatic group chosen from pyridyl, furanyl, benzofuran-2-yl, benzofuran-3-yl, thienyl, benzothien-2-yl, benzothien-3-yl, dibenzofuranyl, dibenzothienyl, carbazoyl, benzopyridyl, indolinyl and fluorenyl, wherein the aryl and heteroaromatic substituents are each independently:
hydroxy, aryl, mono- or di-($C_1$-$C_{12}$)alkoxyaryl, mono- or di-($C_1$-$C_{12}$)alkylaryl, haloaryl, $C_3$-$C_7$ cycloalkylaryl, $C_3$-$C_7$ cycloalkyl, $C_3$-$C_7$ cycloalkyloxy, $C_3$-$C_7$ cycloalkyloxy($C_1$-$C_{12}$) alkyl, $C_3$-$C_7$ cycloalkyloxy($C_1$-

$C_{12}$)alkoxy, aryl($C_1$-$C_{12}$)alkyl, aryl($C_1$-$C_{12}$)alkoxy, aryloxy, aryloxy($C_1$-$C_{12}$)alkyl, aryloxy($C_1$-$C_{12}$)alkoxy, mono- or di-($C_1$-$C_{12}$)alkylaryl($C_1$-$C_{12}$)alkyl, mono- or di-($C_1$-$C_{12}$)alkoxyaryl($C_1$-$C_{12}$)alkyl, mono- or di-($C_1$-$C_{12}$)alkylaryl($C_1$-$C_{12}$)alkoxy, mono- or di-($C_1$-$C_{12}$)alkoxyaryl($C_1$-$C_{12}$)alkoxy, amino, mono- or di-($C_1$-$C_{12}$)alkylamino, diarylamino, piperazino, N—($C_1$-$C_{12}$)alkylpiperazino, N-arylpiperazino, aziridino, indolino, piperidino, morpholino, thiomorpholino, tetrahydroquinolino, tetrahydroisoquinolino, pyrrolidyl, $C_1$-$C_{12}$ alkyl, $C_1$-$C_{12}$ haloalkyl, $C_1$-$C_{12}$ alkoxy, mono($C_1$-$C_{12}$)alkoxy($C_1$-$C_{12}$)alkyl, acryloxy, methacryloxy, halogen or —C(=O)$R^{15}$, wherein $R^{15}$ is —O$R^{16}$, —N($R^{17}$)$R^{18}$, piperidino or morpholino, wherein $R^{16}$ is allyl, $C_1$-$C_6$ alkyl, phenyl, mono($C_1$-$C_6$)alkyl substituted phenyl, mono($C_1$-$C_6$)alkoxy substituted phenyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl or $C_1$-$C_6$ haloalkyl, and $R^{17}$ and $R^{18}$ are each independently $C_1$-$C_6$ alkyl, $C_5$-$C_7$ cycloalkyl or a substituted or an unsubstituted phenyl, wherein said phenyl substituents are independently $C_1$-$C_6$ alkyl or $C_1$-$C_6$ alkoxy;
(d) an unsubstituted or mono-substituted group chosen from pyrazolyl, imidazolyl, pyrazolinyl, imidazolinyl, pyrrolinyl, phenothiazinyl, phenoxazinyl, phenazinyl and acridinyl, said substituents being $C_1$-$C_{12}$ alkyl, $C_1$-$C_{12}$ alkoxy, phenyl or halogen;
(e) a 4-substituted phenyl, the substituent being a dicarboxylic acid residue or derivative thereof, a diamine residue or derivative thereof, an amino alcohol residue or derivative thereof, a polyol residue or derivative thereof, —(CH$_2$)—, —(CH$_2$)$_e$— or —[O—(CH$_2$)$_e$]$_f$—, wherein e is an integer ranging from 2 to 6 and f is an integer ranging from 1 to 50, and wherein the substituent is connected to an aryl group on another photochromic material;
(f) a group represented by:

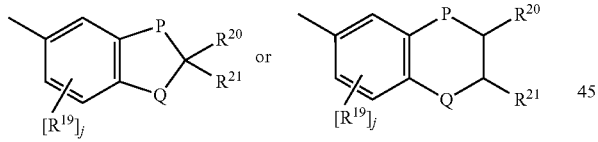

wherein P is —CH$_2$— or —O—; Q is —O— or substituted nitrogen, provided that when Q is substituted nitrogen, P is —CH$_2$—, the substituted nitrogen substituents being hydrogen, $C_1$-$C_{12}$ alkyl or $C_1$-$C_{12}$ acyl; each $R^{19}$ is independently $C_1$-$C_{12}$ alkyl, $C_1$-$C_{12}$ alkoxy, hydroxy or halogen; $R^{20}$ and $R^{21}$ are each independently hydrogen or $C_1$-$C_{12}$ alkyl; and j is an integer ranging from 0 to 2; or
(g) a group represented by:

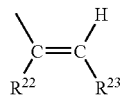

wherein $R^{22}$ is hydrogen or $C_1$-$C_{12}$ alkyl, and $R^{23}$ is an unsubstituted, mono- or di-substituted naphthyl, phenyl, furanyl or thienyl, wherein said naphthyl, phenyl, furanyl and thienyl substituents are independently $C_1$-$C_{12}$ alkyl, $C_1$-$C_{12}$ alkoxy or halogen; or
B and B' taken together form a fluoren-9-ylidene or mono- or di-substituted fluoren-9-ylidene, wherein said fluoren-9-ylidene substituents are independently $C_1$-$C_{12}$ alkyl, $C_1$-$C_{12}$ alkoxy or halogen;

$R^{13}$ and $R^{14}$ are each independently:
(a) the group S';
(b) a metallocenyl group;
(c) a reactive substituent or a compatiblizing substituent;
(d) perhalo($C_1$-$C_{10}$)alkyl, a perhalo($C_2$-$C_{10}$)alkenyl, a perhalo($C_2$-$C_{10}$)alkynyl, a perhalo($C_1$-$C_{10}$)alkoxy or a perhalo($C_3$-$C_{10}$)cycloalkyl;
(e) a group represented by —O(CH$_2$)$_h$(CX$_2$)$_i$CT$_3$, wherein T is a halogen, X is hydrogen or halogen, h is an integer ranging from 1 to 10, and i is an integer ranging from 1 to 10;
(f) a silicon-containing group represented by one of

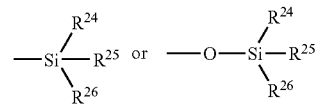

wherein $R^{24}$, $R^{25}$, and $R^{26}$ are each independently $C_1$-$C_{10}$ alkyl, $C_1$-$C_{10}$ alkoxy, or phenyl;
(g) hydrogen, hydroxy, $C_1$-$C_6$ alkyl, chloro, fluoro, $C_3$-$C_7$ cycloalkyl, allyl or $C_1$-$C_8$ haloalkyl;
(h) morpholino, piperidine, pyrrolidino, an unsubstituted, mono- or di-substituted amino, wherein said amino substituents are independently $C_1$-$C_6$ alkyl, phenyl, benzyl or naphthyl;
(i) an unsubstituted, mono-, di- or tri-substituted aryl group chosen from phenyl, naphthyl, benzyl, phenathryl, pyrenyl, quinoyl, isoquinolyl, benzofuranyl, thienyl, benzothienyl, dibenzofuranyl, dibenzothienyl, carbazolyl or indolyl wherein the aryl group substituents are each independently halogen, $C_1$-$C_6$ alkyl or $C_1$-$C_6$ alkoxy;
(j) —C(=O)$R^{27}$, wherein $R^{27}$ is hydrogen, hydroxy, $C_1$-$C_6$ alkyl, $C_1$-$C_6$ alkoxy, amino, mono- or di-($C_1$-$C_6$)alkylamino, morpholino, piperidino, pyrrolidyl, an unsubstituted, mono- or di-substituted phenyl or naphthyl, an unsubstituted, mono- or di-substituted phenoxy, an unsubstituted, mono- or di-substituted phenylamino, wherein said phenyl, naphthyl, phenoxy, and phenylamino substituents are independently $C_1$-$C_6$ alkyl or $C_1$-$C_6$ alkoxy;
(k) —O$R^{28}$, wherein $R^{28}$ is
(i) $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, $C_1$-$C_6$ alkoxy($C_2$-$C_4$)alkyl, $C_3$-$C_7$ cycloalkyl, mono($C_1$-$C_4$)alkyl substituted $C_3$-$C_7$ cycloalkyl, $C_1$-$C_8$ chloroalkyl, $C_1$-$C_8$ fluoroalkyl, allyl or $C_1$-$C_6$ acyl,
(ii) —CH($R^{29}$)$R^{30}$, wherein $R^{29}$ is hydrogen or $C_1$-$C_3$ alkyl, and $R^{30}$ is —CN, —CF$_3$ or —COO$R^{31}$, wherein $R^{31}$ is hydrogen or $C_1$-$C_3$ alkyl, or
(iii) —C(=O)$R^{32}$, wherein $R^{32}$ is hydrogen, $C_1$-$C_6$ alkyl, $C_1$-$C_6$ alkoxy, amino, mono- or di-($C_1$-$C_6$)alkylamino, an unsubstituted, mono- or di-substituted phenyl or naphthyl, an unsubstituted, mono- or di-substituted phenoxy or an unsubstituted, mono- or di-substituted phenylamino, wherein said phenyl, naphthyl, phenoxy and phenylamino substituents are independently $C_1$-$C_6$ alkyl or $C_1$-$C_6$ alkoxy;

(l) a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_e$— or —[O—($CH_2$)$_e$]$_f$—, wherein e is an integer ranging from 2 to 6 and f is an integer ranging from 1 to 50, and wherein the substituent is connected to an aryl group on another photochromic material;

(m) —$CH(R^{33})_2$, wherein $R^{33}$ is —CN or —$COOR^{34}$, wherein $R^{34}$ is hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl or an unsubstituted, mono- or di-substituted phenyl or naphthyl, wherein said phenyl and naphthyl substituents are independently $C_1$-$C_6$ alkyl or $C_1$-$C_6$ alkoxy;

(n) —$CH(R^{35})R^{36}$, wherein $R^{35}$ is hydrogen, $C_1$-$C_6$ alkyl or an unsubstituted, mono- or di-substituted phenyl or naphthyl, wherein said phenyl and naphthyl substituents are independently $C_1$-$C_6$ alkyl or $C_1$-$C_6$ alkoxy, and $R^{36}$ is —C(=O)$OR^{37}$, —C(=O)$R^{38}$ or —$CH_2OR^{39}$, wherein (i) $R^{37}$ is hydrogen, $C_1$-$C_6$ alkyl, $C_3$-$C_7$ cycloalkyl, phenyl($C_1$-$C_3$)alkyl, mono($C_1$-$C_6$)alkyl substituted phenyl($C_1$-$C_3$)alkyl, mono($C_1$-$C_6$)alkoxy substituted pheny($C_1$-$C_3$)alkyl or an unsubstituted, mono- or di-substituted phenyl or naphthyl, wherein said phenyl and naphthyl substituents are independently $C_1$-$C_6$ alkyl or $C_1$-$C_6$ alkoxy, (ii) $R^{38}$ hydrogen, $C_1$-$C_6$ alkyl, amino, mono($C_1$-$C_6$) alkylamino, di($C_1$-$C_6$) alkylamino, phenylamino, diphenylamino, (mono- or di-($C_1$-$C_6$)alkyl substituted phenyl)amino, (mono- or di-($C_1$-$C_6$)alkoxy substituted phenyl)amino, di(mono- or di-($C_1$-$C_6$) alkyl substituted phenyl)amino, di(mono- or di-($C_1$-$C_6$)alkoxy substituted phenyl)amino, morpholino, piperidino or an unsubstituted, mono- or di-substituted phenyl or naphthyl, wherein said phenyl or naphthyl substituents are independently $C_1$-$C_6$ alkyl or $C_1$-$C_6$ alkoxy, and (iii) $R^{39}$ is hydrogen, —C(=O)$R^{37}$, $C_1$-$C_6$ alkyl, $C_1$-$C_3$ alkoxy ($C_1$-$C_6$)alkyl, phenyl($C_1$-$C_6$)alkyl, mono-alkoxy substituted phenyl($C_1$-$C_6$)alkyl or an unsubstituted, mono- or di-substituted phenyl or naphthyl, wherein said phenyl or naphthyl substituents are independently $C_1$-$C_6$ alkyl or $C_1$-$C_6$ alkoxy; or $R^{13}$ and $R^{14}$ together form an oxo group, a spiro-carbocyclic group containing 3 to 6 carbon atoms or a spiro-heterocyclic group containing 1 to 2 oxygen atoms and 3 to 6 carbon atoms including the spirocarbon atom, said spiro-carboxyclic and spiro-heterocyclic groups being annellated with 0, 1 or 2 benzene rings;

$R^5$, $R^8$, $R^9$ and $R^{12}$ are each independently:

(a) hydrogen, $C_1$-$C_6$ alkyl, chloro, fluoro, bromo, $C_3$-$C_7$ cycloalkyl or an unsubstituted, mono- or di-substituted phenyl, wherein said phenyl substituents are independently $C_1$-$C_6$ alkyl or $C_1$-$C_6$ alkoxy;

(b) —$OR^{40}$ or —OC(=O)$R^{40}$ wherein $R^{40}$ is hydrogen, amine, alkylene glycol, polyalkylene glycol, $C_1$-$C_6$ alkyl, phenyl($C_1$-$C_3$)alkyl, mono($C_1$-$C_6$)alkyl substituted phenyl($C_1$-$C_3$)alkyl, mono($C_1$-$C_6$)alkoxy substituted phenyl($C_1$-$C_3$)alkyl, ($C_1$-$C_6$)alkoxy($C_2$-$C_4$) alkyl, $C_3$-$C_7$ cycloalkyl, mono($C_1$-$C_4$)alkyl substituted $C_3$-$C_7$ cycloalkyl or an unsubstituted, mono- or di-substituted phenyl, wherein said phenyl substituents are independently $C_1$-$C_6$ alkyl or $C_1$-$C_6$ alkoxy;

(c) a reactive substituent or a compatiblizing substituent;

(d) a 4-substituted phenyl, the substituent being a dicarboxylic acid residue or derivative thereof, a diamine residue or derivative thereof, an amino alcohol residue or derivative thereof, a polyol residue or derivative thereof, —($CH_2$)—, —($CH_2$)$_e$— or —[O—($CH_2$)$_e$]$_f$—, wherein e is an integer ranging from 2 to 6, and f is an integer ranging from 1 to 50, and wherein the substituent is connected to an aryl group on another photochromic material;

(e) —$N(R^{41})R^{42}$, wherein $R^{41}$ and $R^{42}$ are each independently hydrogen, $C_1$-$C_8$ alkyl, phenyl, naphthyl, furanyl, benzofuran-2-yl, benzofuran-3-yl, thienyl, benzothien-2-yl, benzothien-3-yl, dibenzofuranyl, dibenzothienyl, benzopyridyl and fluorenyl, $C_1$-$C_8$ alkylaryl, $C_3$-$C_8$ cycloalkyl, $C_4$-$C_{16}$ bicycloalkyl, $C_5$-$C_{20}$ tricycloalkyl or $C_1$-$C_{20}$ alkoxy($C_1$-$C_6$)alkyl, or $R^{41}$ and $R^{42}$ come together with the nitrogen atom to form a $C_3$-$C_{20}$ hetero-bicycloalkyl ring or a $C_4$-$C_{20}$ hetero-tricycloalkyl ring;

(f) a nitrogen containing ring represented by:

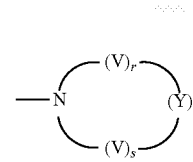

wherein each —V— is independently chosen for each occurrence from —$CH_2$—, —$CH(R^{43})$—, —$C(R^{43})_2$—, —CH(aryl)-, —C(aryl)$_2$- and —$C(R^{43})$(aryl)-, wherein each $R^{43}$ is independently $C_1$-$C_6$ alkyl and each (aryl) is independently phenyl or naphthyl; —Y— is —V—, —O—, —S—, —S(O)—, —$SO_2$—, —NH—, —$N(R^{43})$— or —N(aryl)-; s is an integer ranging from 1 to 3; and r is an integer ranging from 0 to 3, provided that if r is 0 and —Y— is the same as —V—;

(g) a group represented by:

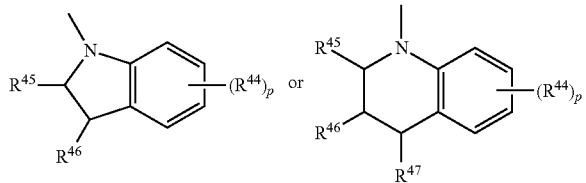

wherein each $R^{44}$ is independently $C_1$-$C_6$ alkyl, $C_1$-$C_6$ alkoxy, fluoro or chloro; $R^{45}$, $R^{46}$ and $R^{47}$ are each independently hydrogen, $C_1$-$C_6$ alkyl, phenyl or naphthyl, or $R^{45}$ and $R^{46}$ together form a ring of 5 to 8 carbon atoms; and p is an integer ranging from 0 to 3; or (h) a substituted or an unsubstituted $C_4$-$C_{18}$ spirobicyclic amine or a substituted or an unsubstituted $C_4$-$C_{18}$ spirotricyclic amine, wherein said substituents are independently aryl, $C_1$-$C_6$ alkyl, $C_1$-$C_6$ alkoxy or phenyl($C_1$-$C_6$)alkyl;

$R^7$ and $R^{10}$ are each independently:
(a) the group S';
(b) any of the groups discussed above with respect to $R^5$, $R^8$, $R^9$ and $R^{12}$; or
(c) a metallocenyl group;
$R^6$ and $R^{11}$ are each independently:
(a) any of the groups discussed above with respect to $R^7$ and $R^{10}$;
(b) perfluoroalkyl or perfluoroalkoxy;
(c) —C(=O)$R^{48}$ or —SO$_2$$R^{48}$ wherein each $R^{48}$ is independently hydrogen, $C_1$-$C_6$ alkyl, —O$R^{49}$ or —N$R^{50}$$R^{51}$, wherein $R^{49}$, $R^{50}$ and $R^{51}$ are each independently hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are independently $C_1$-$C_6$ alkyl or $C_1$-$C_6$ alkoxy;
(d) —C(=C($R^{52}$)$_2$)$R^{53}$, wherein each $R^{52}$ is independently —C(=O)$R^{48}$, —O$R^{49}$, —OC(=O)$R^{49}$, —N$R^{50}$$R^{51}$, hydrogen, halogen, cyano, $C_1$-$C_6$ alkyl, $C_5$-$C_7$ cycloalkyl, alkylene glycol, polyalkylene glycol or an unsubstituted, mono- or di- substituted phenyl, wherein said phenyl substituents are independently $C_1$-$C_6$ alkyl or $C_1$-$C_6$ alkoxy, and $R^{53}$ is hydrogen, $C_1$-$C_6$ alkyl, $C_5$-$C_7$ cycloalkyl, alkylene glycol, polyalkylene glycol or an unsubstituted, mono- or di-substituted phenyl, wherein said phenyl substituents are independently $C_1$-$C_6$ alkyl or $C_1$-$C_6$ alkoxy; or
(e) —C≡C$R^{54}$ or —C≡N wherein $R^{54}$ is —C(=O)$R^{48}$, hydrogen, $C_1$-$C_6$ alkyl, $C_5$-$C_7$ cycloalkyl or an unsubstituted, mono- or di-substituted phenyl, wherein said phenyl substituents are independently $C_1$-$C_6$ alkyl or $C_1$-$C_6$ alkoxy; or a least one pair of adjacent groups $R^6$ and $R^7$ or $R^{10}$ and $R^{11}$ together form a group represented by:

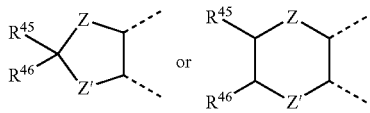

wherein Z and Z' are each independently oxygen or the group —N$R^{41}$—; or $R^6$ and $R^7$ or $R^{10}$ and $R^{11}$ together form an aromatic or heteroaromatic fused group, said fused group being benzo, indeno, dihydronaphthalene, indole, benzofuran, benzopyran or thianaphthene;
provided that the photochromic material comprises at least one group S'.

11. The photochromic material of claim 10, wherein at least one of $R^{13}$ and $R^{14}$ is the group S'.

12. The photochromic polyester of claim 1, wherein the hyperbranched polyester polyol comprising, on average, more than two hydroxyl groups and the group that is adapted to react with the hydroxyl group of the hyperbranched polyester polyol are pre-reacted, wherein the group that is adapted to react with the hydroxyl group of the hyperbranched polyester polyol is an aliphatic diisocyanate represented by OCN—(CR$_2$)$_n$—NCO, wherein n is an integer ranging from 20 to 40 and each R may be, independently, H or $C_1$-$C_4$ alkyl.

13. The photochromic polyester of claim 1, wherein the aliphatic diisocyanate represented by OCN—(CR$_2$)$_n$—NCO, wherein n is an integer ranging from 20 to 40 and each R may be, independently, H or $C_1$-$C_4$ alkyl, and (c) the photochromic compound comprising at least one reactive hydroxyl group are pre-reacted.

14. A photochromic polyester comprising:
(a) a hyperbranched polyester polyol, and
(b) at least two photochromic indeno-fused naphthopyrans bonded (a).

15. The photochromic polyester of claim 14, wherein the at least two photochromic indeno-fused naphthopyrans are independently represented by:

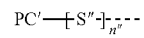

wherein:
(a) PC' is an indeno-fused naphthopyran;
(b) n" is an integer ranging from 1 to 8; and
(c) each S" is independently a group represented by

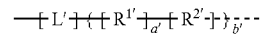

wherein
(i) each L' is independently a linking group that forms at least one covalent bond with a group $R^1$ or a group $R^2$ and at least one covalent bond with PC', the linking group being —O—, —N—, or —S—; or L' comprises a linear or branched organic bridging group comprising a linking group that forms at least one covalent bond with a group $R^{1'}$ or a group $R^{2'}$, the linking group being —O—, —N—, or —S—;
(ii) each a' is an integer ranging from 0 to 500;
(iii) each $R^{1'}$ is independently a ring-opened cyclic monomer;
each $R^{2'}$ is independently a residue a residue of one of a diisocyanate a dicarboxylic acid, a diester, a diamide, a dianhydride, a bis-epoxide, or a bischloroformate, wherein the residue comprises at least one of a urethane group, an ester group, an amide group, an ether group, a thio ester group, a thio ether group, a urea group, or a carbamate group, that forms a bond with the hyperbranched polyester; and
(iv) b' is an integer ranging from 1 to 20.

16. A photochromic composition comprising
(a) the photochromic polyester of claim 14; and
(b) a polyurethane,
wherein the photochromic polyester is bonded to at least a portion of the polyurethane.

17. An photochromic article comprising:
(a) a substrate; and
(b) an at least partial photochromic coating on at least a portion of a surface of the substrate, the at least partial photochromic coating comprising the photochromic polyester of claim 14.

18. The photochromic article of claim 17, wherein the photochromic polyester comprises a reaction product of:
(a) a hyperbranched polyester polyol comprising, on average, more than two hydroxyl groups; and
(b) a photochromic indeno-fused naphthopyran comprising a group that is adapted to react with a hydroxyl group of the hyperbranched polyester polyol.

19. The photochromic article of claim 17, wherein the photochromic article is an optical element chosen from an ophthalmic element, a display element, a window, a mirror, and a liquid crystal cell element.

20. The photochromic article of claim 19, wherein the optical element is an ophthalmic element, said ophthalmic element being at least one of a corrective lens, a non-corrective lens, a magnifying lens, a protective lens, a visor, goggles and a lens for an optical instrument.

21. A photochromic material represented by:

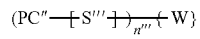

wherein:
(a) W is a hyperbranched polyester polyol;
(b) n''' is an integer ranging from 2 to 100;
(c) each PC'' is independently an indeno-fused naphthopyran;
(d) each S''' is independently a group represented by:

wherein
(i) each L'' is independently a linking group that forms at least one covalent bond with a group $R^{1''}$ or a group $R^{2''}$ and at least one covalent bond with PC'', the linking group being —O—, —N—, or —S—; or L'' comprises a linear or branched organic bridging group comprising a linking group that forms at least one covalent bond with a group $R^{1''}$ or a group $R^{2''}$, the linking group being —O—, —N—, or —S—;
(ii) each a'' is independently an integer ranging from 0 to 500;
(iii) each $R^{1''}$ is independently a ring-opened cyclic monomer;
each $R^{2''}$ is independently a residue of one of a diisocyanate, a dicarboxylic acid, a diester, a diamide, a dianhydride, a bis epoxide, or a bischloroformate, wherein the residue comprises at least one of a urethane group, an ester group, an amide group, an ether group, a thio ester group, a thio ether group, a urea group, or a carbamate group, that forms a bond with a reactive residue on W; and
(iv) each b'' is independently an integer ranging from 1 to 20.

22. A photochromic polyester comprising a reaction product of:
(a) a hyperbranched polyester polyol comprising, on average, more than two hydroxyl groups;
(b) an aliphatic diisocyanate represented by OCN—$(CR_2)_n$—NCO, wherein n is an integer ranging from 20 to 40 and each R may be, independently, H or $C_1$-$C_4$ alkyl; and
(c) an indeno-fused naphthopyran comprising at least one reactive hydroxyl group.

* * * * *